US012799254B2

(12) United States Patent
Satake et al.

(10) Patent No.: US 12,799,254 B2
(45) Date of Patent: Nov. 17, 2026

(54) POLYMER MATERIAL

(71) Applicant: MENICON CO., LTD., Nagoya (JP)

(72) Inventors: Kohsuke Satake, Kasugai (JP); Kengo Asai, Kasugai (JP); Kazuhiro Sunahara, Kasugai (JP); Yurika Satake, Kasugai (JP)

(73) Assignee: MENICON CO., LTD., Nagoya (JP)

( * ) Notice: Subject to any disclaimer, the term of this patent is extended or adjusted under 35 U.S.C. 154(b) by 0 days.

(21) Appl. No.: 18/983,707

(22) Filed: Dec. 17, 2024

(65) Prior Publication Data

US 2025/0115701 A1 Apr. 10, 2025

Related U.S. Application Data

(63) Continuation of application No. 17/265,597, filed as application No. PCT/JP2020/007137 on Feb. 21, 2020, now Pat. No. 12,209,154.

(30) Foreign Application Priority Data

Feb. 26, 2019 (JP) ................................ 2019-032585

(51) Int. Cl.

| | |
|---|---|
| ***C08F 271/02*** | (2006.01) |
| ***C08F 271/00*** | (2006.01) |
| ***C08L 51/00*** | (2006.01) |
| ***C08L 51/08*** | (2006.01) |
| ***C08L 83/04*** | (2006.01) |
| ***G02C 7/02*** | (2006.01) |
| ***G02C 7/04*** | (2006.01) |

(52) U.S. Cl.
CPC .......... *C08F 271/02* (2013.01); *C08F 271/00* (2013.01); *C08L 51/085* (2013.01); *C08L 83/04* (2013.01); *G02C 7/04* (2013.01); *C08L 51/003* (2013.01); *G02C 7/022* (2013.01)

(58) Field of Classification Search
None
See application file for complete search history.

(56) References Cited

U.S. PATENT DOCUMENTS

2004/0054106 A1* 3/2004 Ito ......................... C08F 283/12 526/279
2010/0280146 A1* 11/2010 Vanderlaan ............. A61L 27/26 264/2.6
2016/0289368 A1* 10/2016 Satake ................. C08G 18/672

* cited by examiner

*Primary Examiner* — Eli D. Strah
(74) *Attorney, Agent, or Firm* — Oliff PLC

(57) ABSTRACT

A silicone-containing polymer material containing an internal wetting agent and being excellent in transparency, the silicone-containing polymer material being improved in antifouling property against lipids. The polymer material of the present invention is a polymer material, which is obtained by polymerizing a polymerizable mixture containing monomer components (a) and a hydrophilic polymer component (b), wherein the monomer components (a) include a silicone-containing monomer (a-1) having a siloxane bond and being free of any hydroxyl group, and a compatibilizing monomer (a-2) having a hydrogen bonding proton-containing group and being free of any silicon atom, and wherein the compatibilizing monomer has four or more carbon atoms, excluding carbon atoms contained in a polymerizable functional group, and has a solubility of less than 0.03 g/mL in water at 25 °C.

15 Claims, No Drawings

POLYMER MATERIAL

CROSS REFERENCE TO RELATED APPLICATION

This application is a continuation application of U.S. application Ser. No. 17/265,597, filed Feb. 3, 2021, the contents of which are incorporated herein by reference

TECHNICAL FIELD

The present invention relates to a polymer material, and more specifically, to a polymer material suited for an ocular lens application.

Background Art

Contact lenses are broadly classified into hard contact lenses and soft contact lenses. In recent years, many of the hard contact lenses have had high oxygen permeability by being formed through use of a silicone-containing polymer having a siloxane structure (Si—O—Si), but have caused foreign body sensation when worn owing to their hardness in some cases. Meanwhile, the soft contact lenses provide excellent wearing sensation by being formed from a water-containing hydrogel using a polymer copolymerized from a hydrophilic monomer and a (meth)acrylic monomer serving as copolymerization components, but tend to have low oxygen permeability as compared to the hard contact lenses. To deal with this, a soft contact lens having both of high oxygen permeability and excellent wearing sensation has been developed through use of a silicone hydrogel containing a silicone-based monomer as a further copolymerization component.

However, the soft contact lens formed from the silicone hydrogel is liable to have lipids deposited on its surface. Therefore, the deposition of lipids has been suppressed by plasma treatment or by mixing a hydrophilic polymer as an internal wetting agent into the hydrogel.

When the internal wetting agent is used, compatibility between the internal wetting agent, which has a high degree of hydrophilicity, and the silicone-based monomer, which has a high degree of hydrophobicity, is low. Therefore, in order to compatibilize these components, a silicone-containing monomer having a hydroxyl group, such as methyldi(trimethylsiloxy)silylpropylglycerol methacrylate (sometimes referred to as "SiGMA"), is generally used (for example, Patent Literature 1). With this, a transparent polymer material on which the deposition of lipids is suppressed is obtained. However, there is a demand for a further improvement in antifouling property against lipids.

CITATION LIST

Patent Literature

[PTL 1] JP 2005-518826 A

SUMMARY OF INVENTION

Technical Problem

A primary object of the present invention is to provide a silicone-containing polymer material containing an internal wetting agent, being excellent in transparency, and being improved in antifouling property against lipids.

Solution to Problem

According to one embodiment of the present invention, there is provided a polymer material, which is obtained by polymerizing a polymerizable mixture containing monomer components (a) and a hydrophilic polymer component (b), wherein the monomer components (a) include a silicone-containing monomer (a-1) having a siloxane bond and being free of any hydroxyl group, and a compatibilizing monomer (a-2) having a hydrogen bonding proton-containing group and being free of any silicon atom, and wherein the compatibilizing monomer has four or more carbon atoms, excluding carbon atoms contained in a polymerizable functional group, and has a solubility of less than 0.03 g/mL in water at 25 °C.

In one embodiment, the compatibilizing monomer (a-2) has six or more carbon atoms, excluding the carbon atoms contained in the polymerizable functional group.

In one embodiment, the monomer components (a) further include a hydrophilic monomer (a-3).

In one embodiment, a blending ratio of the hydrophilic polymer component (b) in the polymerizable mixture is from 1 mass % to 30 mass % with respect to a total blending amount of the monomer components (a) and the hydrophilic polymer component (b).

In one embodiment, the compatibilizing monomer (a-2) has: the polymerizable functional group; an intermediate portion containing the hydrogen bonding proton-containing group; and a hydrophobic terminal portion containing two or more carbon atoms.

In one embodiment, the hydrophobic terminal portion contains a branched hydrocarbon group and/or a hydrocarbon group containing a cyclic structure.

In one embodiment, the compatibilizing monomer (a-2) is represented by the following formula (A):

$$Z\text{-}A\text{-}B \qquad (A)$$

where:

Z represents a (meth)acryloyl group;

A represents a divalent atomic group containing the hydrogen bonding proton-containing group or forming the hydrogen bonding proton-containing group together with Z; and B represents a hydrocarbon group having 2 to 20 carbon atoms, provided that a total number of carbon atoms contained in A and B is 4 or more.

In one embodiment, the divalent atomic group represented by the A is represented by the following formula (i):

$$*\text{—X—}R^{a1}\text{-}(L^{a1})_{r1}\text{-}[(R^{a2})_{r2}\text{-}(L^{a2})_{r3}]_{r4}\text{-} \qquad (i)$$

where:

"*" represents a bonding site with Z;

X represents O or $NR^{a3}$;

$R^{a1}$ and $R^{a2}$ each independently represent an alkylene group that has 1 to 20 carbon atoms and may have a hydroxyl group;

$R^{a3}$ represents hydrogen or an alkyl group having 1 to 4 carbon atoms;

$L^{a1}$ and $L^{a2}$ each independently represent an ether bond, an ester bond, a carbonyl group, an amide bond, a urethane bond, or a urea bond;

r1 to r3 each independently represent 0 or 1; and r4 represents an integer of from 0 to 10, provided that:

when $R^{a2}$ is free of any hydroxyl group, none of r3 and r4 represents 0; and the atomic group represented by (i) has at least one hydrogen bonding proton-containing group.

In one embodiment, the $R^{a1}$ represents an alkylene group having 1 to 6 carbon atoms that has a hydroxyl group, r1 represents 0 or 1, and r2 and r3 each represent 0.

In one embodiment, the hydrogen bonding proton-containing group contains a hydroxyl group.

In one embodiment, the silicone-containing monomer (a-1) contains a nitrogen atom.

In one embodiment, the hydrophilic polymer component (b) has a weight average molecular weight of 100,000 or more.

In one embodiment, the hydrophilic polymer component (b) is polyvinylamide.

In one embodiment, the hydrophilic polymer component (b) contains at least one kind selected from poly-N-vinylpyrrolidone, a polyalkylene glycol, a polysaccharide, poly (meth)acrylic acid, and polyvinyl alcohol.

In one embodiment, the hydrophilic polymer component (b) is poly-N-vinylpyrrolidone.

In one embodiment, the polymer material has a Young's modulus of from 0.05 MPa to 2.0 MPa.

According to another embodiment of the present invention, there is provided an ophthalmic medical device, including the polymer material.

In one embodiment, the ophthalmic medical device is a contact lens.

Advantageous Effects of Invention

According to the present invention, the silicone-containing polymer material containing an internal wetting agent and being transparent, the silicone-containing polymer material being improved in antifouling property against lipids, can be provided.

DESCRIPTION OF EMBODIMENTS

Now, embodiments of the present invention are described. However, the present invention is not limited to these embodiments.

A polymer material according to one embodiment of the present invention is obtained by polymerizing a polymerizable mixture containing monomer components (a) and a hydrophilic polymer component (b). More specifically, the monomer components (a) are polymerized under a state in which the monomer components (a) and the hydrophilic polymer component (b) are mixed with each other, preferably compatible with each other. The hydrophilic polymer component (b) to be used in the present invention is typically a non-polymerizable component free of any polymerizable functional group, and when the monomer components (a) are polymerized under such state, there can be obtained a polymer material in which a polymer containing structural units derived from the monomer components (a) and the hydrophilic polymer component (b) are highly complexed with each other.

As used herein, the term "monomer" means a polymerizable compound having one or more polymerizable functional groups. Accordingly, a polymerizable compound formed of two or more monomer units (sometimes referred to as oligomer) and a polymerizable compound having a large molecular weight (sometimes referred to as macromer or macromonomer) are also encompassed in the monomer.

Examples of the polymerizable functional group include a (meth)acryloyl group, a vinyl group, and an allyl group.

As used herein, the description "(meth)" means optional methyl substitution. Accordingly, the description "(meth) acryloyl" means methacryloyl and/or acryloyl. Other descriptions such as "(meth)acrylic" have similar meanings.

A. Polymerizable Mixture

The polymerizable mixture contains monomer components (a) and a hydrophilic polymer component (b), wherein the monomer components (a) include a silicone-containing monomer (a-1) having a siloxane bond and being free of any hydroxyl group, and a compatibilizing monomer (a-2) having a hydrogen bonding proton-containing group and being free of any silicon atom. The compatibilizing monomer (a-2) compatibilizes the silicone-containing monomer (a-1) and the hydrophilic polymer component (b), and besides, can contribute to an improvement in antifouling property against lipids, and hence a polymer material having excellent transparency and an excellent antifouling property can be obtained. In addition, the polymerizable mixture may further contain any appropriate additive (c) as required.

In one embodiment, the polymerizable mixture is substantially free of any silicone-containing monomer having a hydroxyl group, more specifically, such a silicone-containing monomer having a hydroxyl group as SiGMA. Herein, the phrase "substantially free of any silicone-containing monomer having a hydroxyl group" means that the blending ratio of the monomer in the polymerizable mixture is 0.1 mass % or less with respect to the total blending amount of the monomer components (a) and the hydrophilic polymer component (b).

Monomer Components (a)

The monomer components include a silicone-containing monomer (a-1) having a siloxane bond and being free of any hydroxyl group, and a compatibilizing monomer (a-2) having a hydrogen bonding proton-containing group and being free of any silicon atom, and preferably further include a hydrophilic monomer (a-3). The monomer components may further include, as required, one or more kinds selected from a crosslinkable monomer (a-4), a functional monomer (a-5), and any other copolymerization monomer (a-6). The total content ratio of the silicone-containing monomer (a-1), the compatibilizing monomer (a-2), and the hydrophilic monomer (a-3) in all monomer components may be set to, for example, from 30 mass % to 99 mass %, preferably from 70 mass % to 95 mass %.

Silicone-Containing Monomer (a-1)

The silicone-containing monomer can impart high oxygen permeability to the polymer material by virtue of having a siloxane structure (Si—O—Si). Any appropriate monomer may be used as the silicone-containing monomer as long as the monomer has a siloxane bond and is free of any hydroxyl group. In one embodiment, there may be used a silicone-containing monomer free of not only any hydroxyl group, but also any ionic group, such as a carboxyl group, a sulfonic acid group, or a phosphoric acid group.

Examples of the silicone-containing monomer include monomers that have hitherto been used as materials for contact lenses, such as silicone-containing monomers (excluding those having a hydroxyl group) described in paragraph 0039 to paragraph 0044 of JP 2015-503631 A, silicone-containing monomers described in paragraph 0060 to paragraph 0065 of JP 2014-40598 A, and silicone-containing monomers described in p paragraph 0024 to of WO paragraph 0037 of WO 2015/92858 A1 (specifically a polysiloxane-based macromonomer represented by the following formula (A), preferably the formula (A-1), (A-2), or (A-3)). Those publications are incorporated herein by reference in their entirety. The silicone-containing monomers may be used alone or as a mixture thereof.

$$A^1\text{-}Z^1\text{—}U^1\text{—}Z^2\text{—}Z^3\text{—}(\text{—}S^1\text{—}U^2\text{—})_n\text{—}S^2\text{—}Z^4\text{—}Z^5\text{—}U^3\text{—}Z^6\text{-}A^2 \quad (A)$$

The symbols in the general formula (A) are described below.

1) "n" represents 0 or an integer of from 1 to 10.

2) A1 and A2 represent groups represented by the following general formulae (A-II) and (A-III), respectively. In the following general formula (A-II) and general formula (A-III), $Y^{21}$ and $Y^{22}$ each independently represent an acryloyloxy group, a methacryloyloxy group, a vinyl group, or an allyl group, and $R^{21}$ and $R^{22}$ each independently represent a direct bond or a linear or branched alkylene group having 2 to 6 carbon atoms.

$$Y^{21}—R^{21} \quad \text{(A-II)}$$

$$—R^{22}—Y^{22} \quad \text{(A-III)}$$

3) $Z^1$, $Z^2$, $Z^3$, $Z^4$, $Z^5$, and $Z^6$ each independently represent a direct bond or a polyoxyalkylene chain containing an oxyalkylene group as a repeating unit. At least one or more of $Z^1$ to $Z^6$ represent a polyoxyethylene chain in which the number of repetitions of an oxyethylene group is 2 or more, preferably from 4 to 15, and at least one or more of $Z^1$ to $Z^6$ not representing the polyoxyethylene chain represent a polyoxyalkylene chain containing an oxyalkylene group other than the oxyethylene group as a repeating unit (e.g., a polyoxypropylene chain containing an oxypropylene group as a constituent unit, a specific example of which is a polyoxypropylene chain in which the number of repetitions of an oxypropylene group is from 5 to 16).

4) $U^1$ represents a group represented by the following general formula (A-IV), and contains a urethane bond in the molecular chain of the polysiloxane-based macromonomer. In the following general formula (A-IV), $E^{21}$ represents an —NHCO— group (in this case, $E^{21}$ forms a urethane bond with $X^{21}$) or a divalent group derived from a diisocyanate selected from the group consisting of saturated or unsaturated aliphatic, alicyclic, and aromatic diisocyanates (in this case, $E^{21}$ forms a urethane bond between $Z^1$ and $X^{21}$), and $X^{21}$ represents an oxygen atom.

$$-E^{21}-X^{21}— \quad \text{(A-IV)}$$

5) $U^2$ represents a group represented by the following general formula (A-VI), and contains a urethane bond in the molecular chain of the polysiloxane-based macromonomer. In the following general formula (A-VI), $R^{41}$ and $R^{42}$ each independently represent a linear or branched alkylene group having 2 to 6 carbon atoms, $X^{41}$ and $X^{42}$ each independently represent an oxygen atom or an alkylene glycol group, and $E^{41}$ represents a divalent group derived from a diisocyanate selected from the group consisting of saturated or unsaturated aliphatic, alicyclic, and aromatic diisocyanates (in this case, $E^{41}$ forms a urethane bond between $X^{41}$ and $X^{42}$).

$$—R^{41}—X^{41}-E^{41}-X^{42}—R^{42}— \quad \text{(A-VI)}$$

6) $U^3$ represents a group represented by the following general formula (A-VII), and contains a urethane bond in the molecular chain of the polysiloxane-based macromonomer. In the following general formula (A-VII), $X^{22}$ represents an oxygen atom, and $E^{22}$ represents an —NHCO— group (in this case, $E^{22}$ forms a urethane bond between itself and $X^{22}$) or a divalent group derived from a diisocyanate selected from the group consisting of saturated or unsaturated aliphatic, alicyclic, and aromatic diisocyanates (in this case, $E^{22}$ forms a urethane bond between $Z^5$ and $X^{22}$).

$$—X^{22}-E^{22}- \quad \text{(A-VII)}$$

7) $S^1$ and $S^2$ each independently represent a group represented by the following general formula (A-V). In the following general formula (A-V), $R^{31}$ and $R^{38}$ each independently represent a linear or branched alkylene group having 2 to 6 carbon atoms, and $R^{32}$, $R^{33}$, $R^{34}$, $R^{35}$, $R^{36}$, and $R^{37}$ each independently represent an alkyl group having 1 to 6 carbon atoms, an alkyl group substituted with fluorine, or a phenyl group. In addition, K represents an integer of from 1 to 1,500, L represents 0 or an integer of from 1 to 1,500, and the sum of K and L: "K+L" is an integer of from 1 to 1,500.

(A-V)

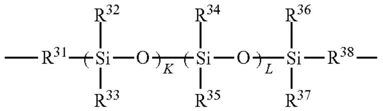

General formula (A-1):

一般式 (A-1)

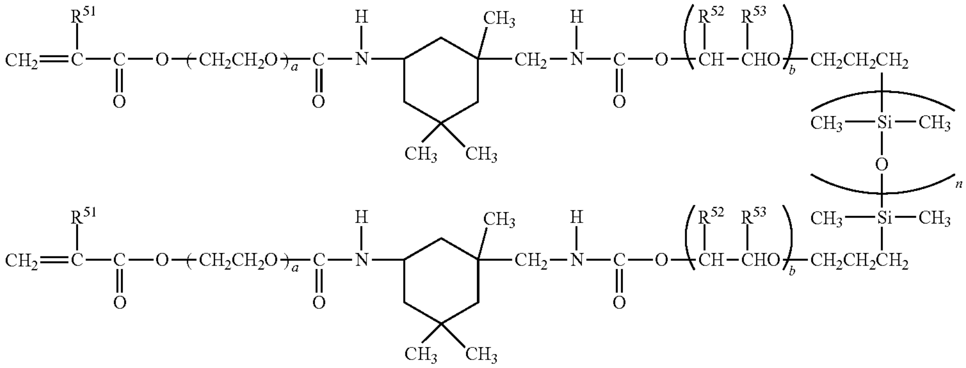

In the formula, $R^{51}$ represents a hydrogen atom or a methyl group, "a" represents an integer of 2 or more, "b" represents an integer of 2 or more, and "n" represents an integer of from 1 to 1,500. In addition, $R^{52}$ and $R^{53}$ each represent a hydrogen atom or a methyl group. When $R^{52}$ represents a hydrogen atom, $R^{53}$ represents a methyl group, and when $R^{52}$ represents a methyl group, $R^{53}$ represents a hydrogen atom.

General formula (A-2):

一般式 (A-2)

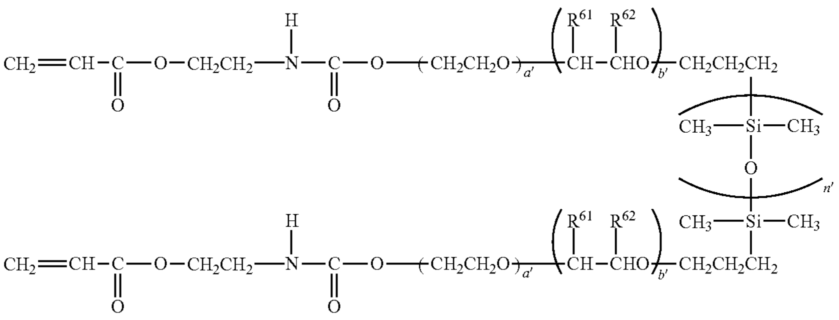

In the formula, a' represents an integer of 2 or more, b' represents an integer of 2 or more, and n' represents an integer of from 1 to 1,500. In addition, $R^{61}$ and $R^{62}$ each represent a hydrogen atom or a methyl group. When $R^{61}$ represents a hydrogen atom, $R^{62}$ represents a methyl group, and when $R^{61}$ represents a methyl group, $R^{62}$ represents a hydrogen atom.

General Formula (A-3):

一般式 (A-3)

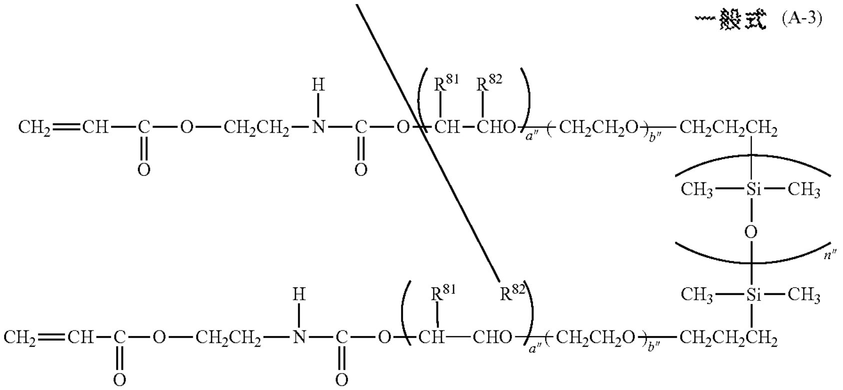

In the formula, a" represents an integer of 2 or more, b" represents an integer of 2 or more, and n" represents an integer of from 1 to 1,500. In addition, $R^{81}$ and $R^{82}$ each represent a hydrogen atom or a methyl group. When $R^{81}$ represents a hydrogen atom, $R^{82}$ represents a methyl group, and when $R^{81}$ represents a methyl group, $R^{82}$ represents a hydrogen atom.

Other specific examples of the silicone-containing monomer include: silicone-containing alkyl (meth)acrylates, such as trimethylsiloxydimethylsilylmethyl (meth)acrylate, trimethylsiloxydimethylsilylpropyl (meth)acrylate, methylbis(trimethylsiloxy)silylpropyl (meth)acrylate, tris(trimethylsiloxy)silylpropyl (meth)acrylate, mono[methylbis(trimethylsiloxy)siloxy]bis(trimethylsiloxy)silylpropyl (meth)acrylate, tris[methylbis(trimethylsiloxy)siloxy]silylpropyl (meth)acrylate, methylbis(trimethylsiloxy)silylpropylglyceryl (meth)acrylate, tris(trimethylsiloxy)silylpropylglyceryl (meth)acrylate, mono[methylbis(trimethylsiloxy)siloxy]bis(trimethylsiloxy)silylpropylglyceryl (meth)acrylate, trimethylsilylethyltetramethyldisiloxypropylglyceryl (meth)acrylate, trimethylsilylmethyl (meth)acrylate, trimethylsilylpropylglyceryl (meth)acrylate, trimethylsilylpropyl (meth)acrylate, trimethylsiloxydimethylsilylpropylglyceryl (meth)acrylate, methylbis(trimethylsiloxy)silylethyltetramethyldisiloxymethyl (meth)acrylate, tetramethyltriisopropylcyclotetrasiloxanylpropyl (meth)acrylate, and tetramethyltriisopropylcyclotetrasiloxybis (trimethylsiloxy)silylpropyl (meth)acrylate; silicone-containing styrene derivatives, such as tris(trimethylsiloxy)silylstyrene, bis(trimethylsiloxy)methylsilylstyrene, (trimethylsiloxy)dimethylsilylstyrene, tris(trimethylsiloxy)siloxydimethylsilylstyrene, [bis(trimethylsiloxy)methylsiloxy]dimethylsilylstyrene, (trimethylsiloxy)dimethylsilylstyrene, heptamethyltrisiloxanylstyrene, nonamethyltetrasiloxanylstyrene, pentadecamethylheptasiloxanylstyrene, heneicosamethyldecasiloxanylstyrene, heptacosamethyltridecasiloxanylstyrene, hentriacontamethylpentadecasiloxanylstyrene, trimethylsiloxypentamethyldisiloxymethylsilylstyrene, tris(pentamethyldisiloxy)silylstyrene, tris(trimethylsiloxy)siloxybis(trimethylsiloxy)silylstyrene, bis(heptamethyltrisiloxy)methylsilylstyrene, tris[methylbis(trimethylsiloxy)siloxy]silylstyrene, heptakis(trimethylsiloxy)trisilylstyrene, trimethylsiloxybis[tris(trimethylsiloxy)siloxy]silylstyrene, nonamethyltetrasiloxyundecylmethylpentasiloxymethylsilylstyrene, tris[tris(trimethylsiloxy)siloxy]silylstyrene, (tristrimethylsiloxyhexamethyl)tetrasiloxy[tris(trimethylsiloxy)siloxy]trimethylsiloxysilylstyrene, nonakis(trimethylsiloxy)tetrasilylstyrene, bis(tridecamethylhexasiloxy)methylsilylstyrene, heptamethylcyclotetrasiloxanylstyrene, heptamethylcyclotetrasiloxybis(trimethylsiloxy)silylstyrene, tripropyltetramethylcyclotetrasiloxanylstyrene, and trimethylsilylstyrene; and silicone-containing fumaric acid diesters, such as bis(3-(trimethylsilyl)propyl) fumarate, bis(3-(pentamethyldisiloxanyl)propyl) fumarate, and bis(tris(trimethylsiloxy)silylpropyl) fumarate.

Still other specific examples of the silicone-containing monomer include mono(meth)acryloyloxypropyl-terminated mono-n-butyl-terminated polydimethylsiloxane, mono(meth)acryloyloxypropyl-terminated mono-n-methyl-terminated polydimethylsiloxane, mono(meth)acryloyloxypropyl-terminated mono-n-butyl-terminated polydiethylsiloxane, mono(meth)acryloyloxypropyl-terminated mono-n-methyl-terminated polydiethylsiloxane, mono(meth)acryloylaminopropyl-terminated mono-n-butyl-terminated polydimethylsiloxane, mono(meth)acryloylaminopropyl-terminated mono-n-methyl-terminated polydimethylsiloxane, mono(meth)acryloylaminopropyl-terminated mono-n-butyl-terminated polydiethylsiloxane, and mono(meth)acryloylaminopropyl-terminated mono-n-methyl-terminated polydiethylsiloxane. In those silicone-containing monomers, the number of repetitions of (Si—O) may be, for example, from 4 to 20, preferably from 4 to 12, more preferably from 4 to 10.

In one embodiment, a silicone-containing monomer containing a nitrogen atom is used. When the silicone-containing monomer contains a nitrogen atom, its compatibility with the hydrophilic monomer becomes higher, and by virtue of a synergistic effect with the compatibilizing monomer, the transparency of a lens can be maintained even when the content of the silicone-containing monomer is increased.

The blending ratio of the silicone-containing monomer in the polymerizable mixture may be set to, for example, from 1 mass % to 70 mass %, preferably from 5 mass % to 60 mass %, more preferably from 10 mass % to 50 mass % with respect to the total blending amount of the monomer components (a) and the hydrophilic polymer component (b). When the blending ratio of the silicone-containing monomer falls within the ranges, a polymer material having high oxygen permeability can be obtained.

Compatibilizing Monomer (a-2)

The compatibilizing monomer can contribute to improvements in compatibility between the hydrophilic polymer component and the silicone-containing monomer and antifouling property against lipids. As the compatibilizing monomer, there is used a monomer having a hydrogen bonding proton-containing group and being free of any silicon atom, the monomer having four or more carbon atoms except for carbon atoms contained in a polymerizable functional group. In a related-art silicone hydrogel containing a hydrophilic polymer (internal wetting agent), compatibility between a silicone component and a hydrophilic polymer is secured through use of a silicone-containing monomer (typically SiGMA) having a hydroxyl group, which has high affinity with the hydrophilic polymer, and a siloxane (—Si—O—Si—) moiety, which has high affinity with the silicone component. In contrast, in the present invention, despite the use of the monomer free of any silicon atom, more satisfactory compatibility can be secured than in the case of using SiGMA, and further, an improving effect on the antifouling property against lipids can also be obtained.

Examples of the hydrogen bonding proton-containing group include a hydroxyl group, a carboxyl group, an amino group, an amide bond, a sulfonic acid group (—$SO_3H$), a urethane bond, and a urea bond. Of those, a hydroxyl group is preferred. The number of hydrogen bonding proton-containing groups that the compatibilizing monomer has is, for example, from 1 to 12, preferably from 1 to 5, more preferably from 1 to 3, still more preferably 1 or 2.

The number of carbon atoms that the compatibilizing monomer has (excluding carbon atoms contained in a polymerizable functional group) is, for example, 6 or more, preferably from 6 to 25, more preferably from 7 to 15, still more preferably from 8 to 13. The compatibilizing monomer has, for example, four or more carbon atoms, more preferably 5 to 15, still more preferably 8 to 13 carbon atoms, per hydrogen bonding proton-containing group.

The solubility of the compatibilizing monomer in water at 25 °C is typically less than 0.03 g/mL, preferably 0.02 g/mL or less, more preferably from 0 g/mL to 0.01 g/mL. The use of the monomer having hydrophobic nature as a whole though having a hydrogen bonding proton-containing group, such as a hydroxyl group, can contribute to an improvement in compatibility between the silicone-containing monomer and the hydrophilic polymer or the hydrophilic monomer.

In one embodiment, the compatibilizing monomer has, in addition to the polymerizable functional group and the hydrogen bonding proton-containing group, a hydrophobic group containing two or more carbon atoms, preferably four or more carbon atoms. In such embodiment, it is preferred that the compatibilizing monomer have the polymerizable functional group, an intermediate portion containing the hydrogen bonding proton-containing group, and a hydrophobic terminal portion containing two or more carbon atoms. More specifically, it is preferred that: the polymerizable functional group be arranged at one terminal portion of a molecule of the compatibilizing monomer; the hydrophobic group be arranged at the other terminal portion; and a group having relatively high hydrophilicity containing the hydrogen bonding proton-containing group be arranged therebetween. The compatibilizing monomer having a hydrogen bonding proton-containing group at a position relatively close to a polymerizable functional group, such as a (meth)acryloyl group, and having a terminal hydrophobic group at a position relatively distant therefrom can exhibit excellent affinity for both the hydrophilic polymer and the silicone-containing monomer.

The compatibilizing monomer in the above-mentioned embodiment may be represented by the following formula (A):

$$Z\text{-}A\text{-}B \qquad (A)$$

where:

Z represents a (meth)acryloyl group;

A represents a divalent atomic group containing the hydrogen bonding proton-containing group or forming the hydrogen bonding proton-containing group together with Z; and B represents a hydrocarbon group having 2 to 20 carbon atoms, provided that the total number of carbon atoms contained in A and B is 4 or more.

In the formula (A), the divalent atomic group set forth in A may be represented by, for example, the following formula (i):

$$*\text{—}X\text{—}R^{a1}\text{-}(L^{a1})_{r1}\text{-}[(R^{a2})_{r2}\text{-}(L^{a2})_{r3}]_{r4}\text{-} \qquad (i)$$

where:

"*" represents a bonding site with Z;

X represents 0 or $NR^{a3}$;

$R^{a1}$ and $R^{a2}$ each independently represent an alkylene group that has 1 to 20 carbon atoms and may have a hydroxyl group;

$R^{a3}$ represents hydrogen or an alkyl group having 1 to 4 carbon atoms;

$L^{a1}$ and $L^{a2}$ each independently represent an ether bond, an ester bond, a carbonyl group, an amide bond, a urethane bond, or a urea bond;

r1 to r3 each independently represent 0 or 1; and r4 represents an integer of from 0 to 10, provided that:

when $R^{a2}$ is free of any hydroxyl group, none of r3 and r4 represents 0; and the atomic group represented by (i) has at least one hydrogen bonding proton-containing group.

$R^{a1}$ and $R^{a2}$ each independently represent preferably an alkylene group that has 1 to 6 carbon atoms and may have a hydroxyl group, more preferably an alkylene group that has 1 to 4 carbon atoms and may have a hydroxyl group. Specifically, it is preferred that at least one of $R^{a1}$ or $R^{a2}$ have a hydroxyl group, and it is more preferred that $R^{a1}$ have a hydroxyl group. Examples of such embodiment include an embodiment in which $R^{a1}$ has a hydroxyl group and $R^{a2}$ is absent (e.g., an embodiment in which r1=0 or 1, r2=0, and r3=0) and an embodiment in which $R^{a1}$ and $R^{a2}$ both have a hydroxyl group (e.g., an embodiment in which r1=1, r2=1, and r3=0 or 1).

When present, $L^{a1}$ and $L^{a2}$ may preferably each independently represent an ether bond or an ester bond. When both of $R^{a1}$ and $R^{a2}$ are free of any hydroxyl group, at least one of $L^{a1}$ or $L^{a2}$ preferably represents an amide bond, a urethane bond, or a urea bond.

The hydrocarbon group set forth in B described above may be linear, may be branched, or may contain a cyclic structure, and may contain a heteroatom at any appropriate position. The heteroatom is not limited as long as the effects of the present invention are obtained, and examples thereof include halogens, such as fluorine. B may represent a hydrocarbon group (e.g., an alkyl group) having preferably 4 to 20 carbon atoms, more preferably 5 to 12 carbon atoms, and being unsubstituted or substituted with fluorine.

Specific examples of the compatibilizing monomer in the above-mentioned embodiment are shown in the following formula (I), (V), or (VI).

(I)

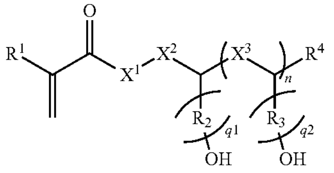

where:

$R^1$ represents a hydrogen atom or a methyl group;

$R^2$ and $R^3$ each independently represent an alkylene group having 1 to 6 carbon atoms;

$R^4$ represents a hydrocarbon group having 2 to 20 carbon atoms, or a structure represented by $—(R^{5a})_s—O—R^{5b}$, $—(R^{5a})_s—O(C{=}O)—R^{5b}$, or $—(R^{5a})_s—(C{=}O)O—R^{5b}$ (where $R^{5a}$ represents an alkylene group having 1 to 4 carbon atoms, $R^{5b}$ represents a hydrocarbon group having 2 to 20 carbon atoms, and "s" represents 0 or 1);

$X^1$ represents O or $NR^6$ (where $R^6$ represents hydrogen or an alkyl group having 1 to 4 carbon atoms);

$X^2$ represents a single bond or an alkylene group having 1 to 3 carbon atoms;

$X^3$ represents a single bond, an alkylene group having 1 to 6 carbon atoms, or a structure represented by $—(R^{7a})_t—O—(R^{7b})_u—$, $—(R^{7a})_t—O(C{=}O)—(R^{7b})_u—$, $—(R^{7a})_t—(C{=}O)O—(R^{7b})_u—$, $—(R^{7a})_t—O(C{=}O)—(R^{7b})_u—$, or any one of the following formulae (II) to (IV):

(II)

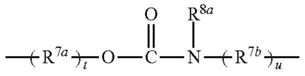

(III)

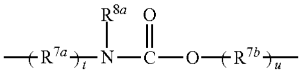

(IV)

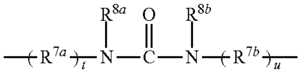

(where $R^{7a}$ represents an alkylene group having 1 to 4 carbon atoms, $R^{7b}$ represents an alkylene group having 1 to 20 carbon atoms, $R^{8a}$ and $R^{8b}$ each independently represent a hydrogen atom or an alkyl group having 1 to 4 carbon atoms, and "t" and "u" each independently represent 0 or 1);

"n" represents an integer of from 0 to 10; and q1 and q2 each independently represent 0 or 1, provided that:

the total number of carbon atoms contained in a residue excluding the polymerizable functional group ($CH_2{=}CR^1—CO—$) is 3 or more; and the hydrocarbon groups or alkyl groups set forth in $R^4$, $R^{5b}$, $R^6$, $R^{8a}$, and $R^{8b}$ may each independently have a heteroatom.

With regard to the formula (I), the hydrocarbon groups set forth in $R^4$ and $R^{5b}$ are each an aliphatic hydrocarbon group (e.g., an alkyl group) having preferably 2 to 12 carbon atoms, more preferably 3 to 10 carbon atoms, still more preferably 4 to 10 carbon atoms. Each of those hydrocarbon groups may be linear, may be branched, or may contain a cyclic structure. It is conceived that, by virtue of those hydrocarbon groups functioning as terminal hydrophobic groups, the compatibilizing monomer can exhibit affinity for the silicone-containing monomer.

Specific examples of the hydrocarbon group set forth in $R^4$ or $R^{5b}$ include: linear alkyl groups, such as an ethyl group, a n-propyl group, a n-butyl group, a n-pentyl group, a n-hexyl group, a n-heptyl group, a n-octyl group, a n-nonyl group, and a n-decyl group; branched alkyl groups, such as an isopropyl group, a methylpropyl group, a t-butyl group, a dimethylpropyl group, an ethylpropyl group, a diethylpropyl group, a methylbutyl group, a dimethylbutyl group, a trimethylbutyl group, an ethylbutyl group, a propylbutyl group, a methylpentyl group, a dimethylpentyl group, an ethylpentyl group, a propylpentyl group, a butylpentyl group, a methylhexyl group, a dimethylhexyl group, a trimethylhexyl group, an ethylhexyl group, a propylhexyl group, a butylhexyl group, a methylheptyl group, a dimethylheptyl group, an ethylheptyl group, a propylheptyl group, a methyloctyl group, a dimethyloctyl group, an ethyloctyl group, and a methylnonyl group; cycloalkyl groups, such as a cyclopropyl group, a cyclobutyl group, a cyclopentyl group, a cyclohexyl group, a cycloheptyl group, a cyclooctyl group, and a cyclononyl group; cycloalkyl ring-containing alkyl groups, such as a cyclooctylethyl group, a cycloheptylmethyl group, a cycloheptylethyl group, a cyclohexylmethyl group, a cyclohexylethyl group, a cyclohexylpropyl group, a cyclohexylbutyl group, a cyclopentylethyl group, a cyclopentylpropyl group, a cyclopentylbutyl group, a cyclopentylpentyl group, a cyclobutylpropyl group, a cyclobutylbutyl group, a cyclobutylpentyl group, a cyclopropylbutyl group, a cyclopropylpentyl group, and a cyclopropylhexyl group; and bridged alicyclic hydrocarbon groups, such as a norbornyl group, a tricyclodecanyl group, a tetracyclododecyl group, an adamantyl group, a methyladamantyl group, an ethyladamantyl group, and a butyladamantyl group.

The groups represented by $R^6$, $R^{8a}$, and $R^{8b}$ are each preferably hydrogen or an alkyl group having 1 or 2 carbon atoms.

The alkylene groups set forth in $X^3$, $R^2$, $R^3$, $R^{5a}$, and $R^{7a}$ are each preferably a methylene group, an ethylene group, a propylene group, or a butylene group, more preferably a methylene group or an ethylene group.

The alkylene group set forth in $R^{7b}$ is an alkylene group preferably having 1 to 8 carbon atoms, more preferably 1 to 4 carbon atoms.

The total number of carbon atoms contained in the groups represented by $X^2$ and $R^2$ is preferably 3 or less, more preferably from 0 to 2, still more preferably 1 or 2 (e.g., an embodiment in which $X^2$ represents a methylene group or an ethylene group, and $R^2$ is absent (i.e., an embodiment in which q1=0), or an embodiment in which $X^2$ and $R^2$ both represent a methylene group). It is conceived that, by virtue of a hydroxyl group being arranged near a (meth)acryloyl group, the compatibilizing monomer can exhibit affinity for the hydrophilic polymer.

The total number of carbon atoms contained in the group represented by $X^3$ is preferably from 0 to 10, more preferably from 1 to 5, still more preferably from 1 to 3.

The heteroatom that the hydrocarbon groups or alkyl groups set forth in $R^4$, $R^{5b}$, $R^6$, $R^{8a}$, and $R^{8b}$ may each have is not limited as long as the effects of the present invention are obtained, and examples thereof include halogens, such as fluorine. In one embodiment, the hydrocarbon group or alkyl group set forth in $R^4$, $R^{5b}$, $R^6$, $R^{8a}$, or $R^{8b}$ may be a fluoroalkyl group or a perfluoroalkyl group.

"n" represents preferably from 0 to 5, more preferably 0, 1, or 2.

In one embodiment, in the formula (I), $R^1$ represents a hydrogen atom or a methyl group, $X^1$ represents O, $X^2$ represents a methylene group or an ethylene group, preferably a methylene group, "n" represents 0, $R^4$ represents $—(R^{5a})_s—O—R^{5b}$ (where $R^{5a}$ represents a methylene group, "s" represents 1, and $R^{5b}$ represents a hydrocarbon group that has 2 to 20 carbon atoms and may be substituted with fluorine), and q1 represents 0 or 1, preferably 0.

In one embodiment, in the formula (I), $R^1$ represents a hydrogen atom or a methyl group, $X^1$ represents O, $X^2$ represents a methylene group or an ethylene group, preferably a methylene group, "n" represents 0, $R^4$ represents $—(R^{5a})_s—O(C{=}O)—R^{5b}$ (where $R^{5a}$ represents a methylene group, "s" represents 1, and $R^{5b}$ represents a hydrocarbon group that has 2 to 20 carbon atoms and may be substituted with fluorine), and q1 represents 0 or 1, preferably 0.

In one embodiment, in the formula (I), $R^1$ represents a hydrogen atom or a methyl group, $X^1$ represents O, $X^2$ represents a methylene group or an ethylene group, preferably a methylene group, "n" represents 0, $R^4$ represents a hydrocarbon group that has 2 to 20 carbon atoms and may be substituted with fluorine, and q1 represents 0 or 1, preferably 0.

(V)

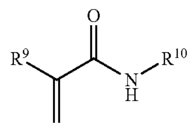

where:

$R^9$ represents a hydrogen atom or a methyl group; and $R^{10}$ represents a hydrocarbon group having 4 to 20 carbon atoms, or a structure represented by $—O—R^{10b}$, $—R^{10a}—O—R^{10b}$, $—R^{10a}—O(C{=}O)—R^{10b}$, $—R^{10a}—(C{=}O)O—R^{10b}$, or $—R^{10a}—(C{=}O)—R^{10b}$ (where $R^{10a}$ represents an alkylene group having 1 to 4 carbon atoms, and $R^{10b}$ represents a hydrocarbon group having 2 to 20 carbon atoms), provided that:

the total number of carbon atoms contained in the group represented by $R^{10}$ is 4 or more; and the hydrocarbon group set forth in $R^{10}$ or $R^{10b}$ may have a heteroatom.

With regard to the formula (V), each hydrocarbon group set forth in $R^{10}$ or $R^{10b}$ is an aliphatic hydrocarbon group (e.g., an alkyl group) having preferably 4 to 12 carbon atoms, more preferably 4 to 10 carbon atoms. Each of those hydrocarbon groups may be linear, may be branched, or may contain a cyclic structure. It is conceived that, by virtue of those hydrocarbon groups functioning as terminal hydrophobic groups, the compatibilizing monomer can exhibit affinity for the silicone-containing monomer.

Specific examples of the hydrocarbon group set forth in $R^{10}$ or $R^{10b}$ may include the same ones (each having four or more carbon atoms) as the specific examples of the hydrocarbon group set forth in $R^4$ or $R^{5b}$.

The alkylene group set forth in $R^{10a}$ is preferably a methylene group, an ethylene group, a propylene group, or a butylene group, more preferably a methylene group or an ethylene group.

The heteroatom that the hydrocarbon group set forth in $R^{10}$ or $R^{10b}$ may have is not limited as long as the effects of the present invention are obtained, and examples thereof include halogens, such as fluorine. In one embodiment, the hydrocarbon group set forth in $R^{10}$ or $R^{10b}$ may be a fluoroalkyl group or a perfluoroalkyl group.

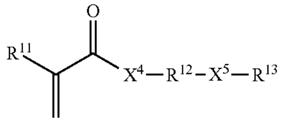
(VI)

where:

$R^{11}$ represents a hydrogen atom or a methyl group;

$X^4$ represents O or $NR^{14}$ (where $R^{14}$ represents a hydrogen atom or an alkyl group having 1 to 4 carbon atoms);

$R^{12}$ represents an alkylene group having 2 to 14 carbon atoms;

$X^5$ represents a single bond, O, or a structure represented by any one of the following formulae (VII) to (IX):

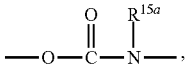
(VII)

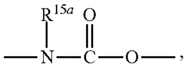
(VIII)

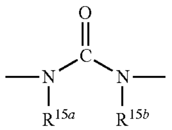
(IX)

(where $R^{15a}$ and $R^{15b}$ each independently represent a hydrogen atom or an alkyl group having 1 to 4 carbon atoms); and $R^{13}$ represents a hydrocarbon group having 2 to 20 carbon atoms, provided that:

when $X^4$ does not represent NH, $X^5$ represents a structure containing a urethane bond (—NHCOO—) or a urea bond (—NHCONH—); and $R^{12}$, $R^{13}$, $R^{14}$, $R^{15a}$, and $R^{15b}$ may each independently have a heteroatom.

With regard to the formula (VI), the alkylene group set forth in $R^{12}$ may be linear, may be branched, or may contain a cyclic structure. $R^{12}$ represents preferably an alkylene group having 2 to 6 carbon atoms, more preferably an ethylene group, a propylene group, or a butylene group.

The hydrocarbon group set forth in $R^{13}$ is an aliphatic hydrocarbon group (e.g., an alkyl group) having preferably 2 to 12 carbon atoms, more preferably 2 to 10 carbon atoms, still more preferably 4 to 10 carbon atoms. The hydrocarbon group may be linear, may be branched, or may contain a cyclic structure. It is conceived that, by virtue of the hydrocarbon group functioning as a terminal hydrophobic group, the compatibilizing monomer can exhibit affinity for the silicone-containing monomer.

Specific examples of the hydrocarbon group set forth in $R^{13}$ may include the same ones as the specific examples of the hydrocarbon group set forth in $R^4$ or $R^{5b}$.

Specific examples of the alkyl group set forth in each of $R^{14}$, $R^{15a}$, and $R^{15b}$ include a methyl group and an ethyl group.

The heteroatom that $R^{12}$, $R^{13}$, $R^{14}$, $R^{15a}$, and $R^{15b}$ may each have is not limited as long as the effects of the present invention are obtained, and examples thereof include halogens, such as fluorine. In one embodiment, $R^{12}$, $R^{13}$, $R^{14}$, $R^{15a}$, or $R^{15b}$ may represent a fluoroalkyl group or a perfluoroalkyl group.

In another embodiment, the compatibilizing monomer has a (meth)acryloyl group and an alicycle containing four or more carbon atoms with at least one hydrogen atom being substituted with a hydrogen bonding proton-containing group. The alicycle has, for example, preferably 5 to 20 carbon atoms, more preferably 6 to 15 carbon atoms, still more preferably 8 to 12 carbon atoms, and may have a bridged structure. Preferred specific examples of the compatibilizing monomer in such embodiment include (meth) acrylates each having a bridged alicyclic group (e.g., an adamantyl group, a norbornyl group, a tricyclodecanyl group, or a tetracyclododecyl group) substituted with one or more hydroxyl groups, more specifically hydroxy(meth) acryloyloxyadamantane and dihydroxy(meth)acryloyloxy-adamantane.

The blending ratio of the compatibilizing monomer in the polymerizable mixture may be set to, for example, from 1 mass % to 60 mass %, preferably from 5 mass % to 50 mass %, more preferably from 10 mass % to 40 mass % with respect to the total blending amount of the monomer components (a) and the hydrophilic polymer component (b). When the blending ratio of the compatibilizing monomer falls within the ranges, there can be obtained a polymer material having excellent transparency and an excellent antifouling property while maintaining high oxygen permeability.

Hydrophilic Monomer (a-3)

The hydrophilic monomer can impart hydrophilicity to a silicone-containing polymer to be produced through polymerization of the monomer components (a), to thereby turn the polymer material, which is a complex of the silicone-containing polymer and the hydrophilic polymer component (b), into a hydrogel. For example, a monomer having a solubility of 0.03 g/mL or more in water at 25 °C (excluding a monomer containing a silicon atom, and a monomer having two or more polymerizable functional groups) is used as the hydrophilic monomer.

Specific example of the hydrophilic monomer include: hydroxy group-containing alkyl (meth)acrylates, such as hydroxyethyl (meth)acrylate, hydroxypropyl (meth)acrylate, and dihydroxypropyl (meth)acrylate; (meth)acrylamides, such as N,N-dimethyl (meth)acrylamide, N-ethyl (meth)acrylamide, N-2-hydroxyethyl (meth)acrylamide, N-isopropyl (meth)acrylamide, and N-acryloylmorpholine; N-vinyllactams, such as N-vinylpyrrolidone, N-vinylpiperidone, and N-vinylcaprolactam; and N-methyllactams, such as 1-methyl-3-methylene-2-pyrrolidinone. Of those, 2-hydroxyethyl (meth)acrylate, N,N-dimethyl (meth)acrylamide, N-acryloylmorpholine, and 1-methyl-3-methylene-2-pyrrolidinone are preferably used. The hydrophilic monomers may be used alone or as a mixture thereof.

The blending ratio of the hydrophilic monomer in the polymerizable mixture may be set to, for example, from 0.1 mass to 90 mass %, preferably from 20 mass % to 80 mass %, more preferably from 25 mass % to 70 mass %, still more preferably from 25 mass % to 50 mass % with respect to the total blending amount of the monomer components (a) and the hydrophilic polymer component (b). When the blending ratio of the hydrophilic monomer falls within the ranges, a polymer material having a high water content and high surface hydrophilicity can be obtained.

Crosslinkable Monomer (a-4)

The crosslinkable monomer is added as required for the purpose of improving, for example, the mechanical strength or shape stability of the polymer material. A monomer having two or more polymerizable functional groups is used as the crosslinkable monomer.

Specific examples of the crosslinkable monomer include butanediol di(meth)acrylate, ethylene glycol di(meth)acrylate, diethylene glycol di(meth)acrylate, triethylene glycol di(meth)acrylate, propylene glycol di(meth)acrylate, dipropylene glycol di(meth)acrylate, diallyl fumarate, allyl (meth)acrylate, vinyl (meth)acrylate, trimethylolpropane tri (meth)acrylate, methacryloyloxyethyl (meth)acrylate, divinylbenzene, diallyl phthalate, diallyl adipate, triallyl diisocyanate, α-methylene-N-vinylpyrrolidone, 4-vinylbenzyl (meth)acrylate, 3-vinylbenzyl (meth)acrylate, 2,2-bis ((meth)acryloyloxyphenyl)hexafluoropropane, 2,2-bis ((meth)acryloyloxyphenyl)propane, 1,4-bis(2-(meth)acryloyloxyhexafluoroisopropyl)benzene, 1,3-bis(2-(meth) acryloyloxyhexafluoroisopropyl)benzene, 1,2-bis(2-(meth) acryloyloxyhexafluoroisopropyl)benzene, 1,4-bis(2-(meth) acryloyloxyisopropyl)benzene, 1,3-bis(2-(meth) acryloyloxyisopropyl)benzene, and 1,2-bis(2-(meth) acryloyloxyisopropyl)benzene. Of those, butanediol di(meth)acrylate and/or ethylene glycol di(meth)acrylate may be preferably used. The crosslinkable monomers may be used alone or as a mixture thereof.

The blending ratio of the crosslinkable monomer in the polymerizable mixture may be set to, for example, from 0 mass % to 3 mass %, preferably from 0.1 mass % to 2.5 mass %, more preferably from 0.3 mass % to 2 mass %, still more preferably from 1.0 mass % to 1.8 mass % with respect to the total blending amount of the monomer components (a) and the hydrophilic polymer component (b). When the blending ratio of the crosslinkable monomer falls within the ranges, a polymer material having satisfactory mechanical strength can be obtained.

Functional Monomer (a-5)

The functional monomer is added as required for the purpose of imparting a predetermined function to the polymer material. Examples of the functional monomer include a polymerizable dyestuff, a polymerizable ultraviolet absorber, and a polymerizable ultraviolet absorbing dyestuff.

Specific example of the polymerizable dyestuff include: azo-based polymerizable dyestuffs, such as 1-phenylazo-4-(meth)acryloyloxynaphthalene, 1-phenylazo-2-hydroxy-3-(meth)acryloyloxynaphthalene, 1-naphthylazo-2-hydroxy-3-(meth)acryloyloxynaphthalene, 1-(α-anthrylazo)-2-hydroxy-3-(meth)acryloyloxynaphthalene, 1-((4'-(phenylazo)-phenyl)azo)-2-hydroxy-3-(meth) acryloyloxynaphthalene, 1-(2',4'-xylylazo)-2-(meth) acryloyloxynaphthalene, 1-(o-tolylazo)-2-(meth) acryloyloxynaphthalene, 2-(m-(meth)acryloylamido-anilino)-4,6-bis(1'-(o-tolylazo)-2'-naphthylamino)-1,3,5-triazine, 2-(m-vinylanilino)-4-((4'-nitrophenylazo)-anilino)-6-chloro-1, 3,5-triazine, 2-(1'-(o-tolylazo)-2'-naphthyloxy)-4-(m-vinylanilino)-6-chloro-1,3,5-triazine, 2-(p-vinylanilino)-4-(1'-(o-tolylazo)-2'naphthylamino)-6-chloro-1,3,5-triazine, N-(1'-(o-tolylazo)-2'-naphthyl)-3-vinylphthalic acid monoamide, N-(1'-(o-tolylazo)-2'-naphthyl)-6-vinylphthalic acid monoamide, 3-vinylphthalic acid-(4'-(p-sulfophenylazo)-1'-naphthyl) monoester, 6-vinylphthalic acid-(4'-(p-sulfophenylazo)-1'-naphthyl) monoester, 3-(meth)acryloylamido-4-phenylazophenol, 3-(meth)acryloylamido-4-(8'-hydroxy-3',6'-disulfo-1'-naphthylazo)-phenol, 3-(meth)acryloylamido-4-(1'-phenylazo-2'-naphthylazo)-phenol, 3-(meth)acryloylamido-4-(p-tolylazo)phenol, 2-amino-4-(m-(2'-hydroxy-1'-naphthylazo) anilino)-6-isopropenyl-1,3,5-triazine, 2-amino-4-(N-methyl-p-(2'-hydroxy-1'-naphthylazo)anilino)-6-isopropenyl-1,3,5-triazine, 2-amino-4-(m-(4'-hydroxy-1'-phenylazo)anilino)-6-isopropenyl-1, 3,5-triazine, 2-amino-4-(N-methyl-p-(4'-hydroxyphenylazo)anilino)-6-isopropenyl-1,3,5-triazine, 2-amino-4-(m-(3'-methyl-1'-phenyl-5'-hydroxy-4'-pyrazolylazo) anilino)-6-isopropenyl-1,3,5-triazine, 2-amino-4-(N-methyl-p-(3'-methyl-1'-phenyl-5'-hydroxy-4'-pyrazolylazo)anilino)-6-isopropenyl-1,3,5-triazine, 2-amino-4-(p-phenylazoanilino)-6-isopropenyl-1,3,5-triazine, and 4-phenylazo-7-(meth) acryloylamido-1-naphthol; anthraquinone-based polymerizable dyestuffs, such as 1,5-bis((meth)acryloylamino)-9,10-anthraquinone, 1-(4'-vinylbenzoylamido)-9, 10-anthraquinone, 4-amino-1-(4'-vinylbenzoylamido)-9,10-anthraquinone, 5-amino-1-(4'-vinylbenzoylamido)-9,10-anthraquinone, 8-amino-1-(4'-vinylbenzoylamido)-9,10-anthraquinone, 4-nitro-1-(4'-vinylbenzoylamido)-9,10-anthraquinone, 4-hydroxy-1-(4'-vinylbenzoylamido)-9,10-anthraquinone, 1-(3'-vinylbenzoylamido)-9,10-anthraquinone, 1-(2'-vinylbenzoylamido)-9,10-anthraquinone, 1-(4'-isopropenylbenzoylamido)-9,10-anthraquinone, 1-(3'-isopropenylbenzoylamido)-9,10-anthraquinone, 1-(2'-isopropenylbenzoylamido)-9,10-anthraquinone, 1,4-bis(4'-vinylbenzoylamido)-9,10-anthraquinone, 1,4-bis(4'-isopropenylbenzoylamido)-9,10-anthraquinone, 1,5'-bis(4'-vinylbenzoylamido)-9,10-anthraquinone, 1,5-bis(4'-isopropenylbenzoylamido)-9,10-anthraquinone, 1-methylamino-4-(3'-vinylbenzoylamido)-9, 10-anthraquinone, 1-methylamino-4-(4'-vinylbenzoyloxyethylamino)-9,10-anthraquinone, 1-amino-4-(3'-vinylphenylamino)-9,10-anthraquinone-2-sulfonic acid, 1-amino-4-(4'-vinylphenylamino)-9,10-anthraquinone-2-sulfonic acid, 1-amino-4-(2'-vinylbenzylamino)-9, 10-anthraquinone-2-sulfonic acid, 1-amino-4-(3'-(meth) acryloylaminophenylamino)-9,10-anthraquinone-2-sulfonic acid, 1-amino-4-(3'-(meth)acryloylaminobenzylamino)-9, 10-anthraquinone-2-sulfonic acid, 1-(β-ethoxycarbonylallylamino)-9,10-anthraquinone, 1-(β-carboxyallylamino)-9,10-anthraquinone, 1,5-di-(β-carboxyallylamino)-9,10-anthraquinone, 1-(β-isopropoxycarbonylallylamino)-5-benzoylamido-9,10-anthraquinone, 2-(3'-(meth) acryloylamido-anilino)-4-(3'-(3"-sulfo-4"-aminoanthraquinon-1"-yl)-amino-anilino)-6-chloro-1,3,5-triazine, 2-(3'-(meth)acryloylamido-anilino)-4-(3'-(3"-sulfo-4"-aminoanthraquinon-1"-yl)-amino-anilino)-6-hydrazino-1,3,5-triazine, 2,4-bis-((4"-methoxyanthraquinon-1"-yl)-amino)-6-(3'-vinylanilino)-1,3,5-triazine, 2-(2'-vinylphenoxy)-4-(4'-(3"-sulfo-4"-aminoanthraquinon-1"-yl-amino)-anilino)-6-chloro-1,3,5-triazine, 1,4-bis(4-(2-methacryloxyethyl)phenylamino)-9,10-anthraquinone, and 1,4-bis((2-methacryloxyethyl)amino)-9,10-anthraquinone; nitro-based polymerizable dyestuffs, such as o-nitroanilinomethyl (meth)acrylate; and phthalocyanine-based polymerizable dyestuffs, such as (meth)acryloylated tetraamino-copper phthalocyanine and (meth)acryloylated (dodecanoylated tetraaminocopper phthalocyanine). Those dyestuffs may be used alone or as a mixture thereof.

Specific example of the polymerizable ultraviolet absorber include: benzophenone-based polymerizable ultraviolet absorbers, such as 2-hydroxy-4-(meth)acryloyloxy-benzophenone, 2-hydroxy-4-(meth)acryloyloxy-5-t-butyl-benzophenone, 2-hydroxy-4-(meth)acryloyloxy-2',4'-dichlorobenzophenone, and 2-hydroxy-4-(2'-hydroxy-3'-(meth)acryloyloxypropoxy)benzophenone; benzotriazole-based polymerizable ultraviolet absorbers, such as 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole, 2-(2'-hydroxy-5'-(meth)acryloyloxypropyl-3'-t-butylphenyl)-5-chloro-2H-benzotriazole, and 2-(2'-hydroxy-5'-(2"-methacryloyloxyethoxy)-3'-t-butylphenyl)-5-methyl-2H-benzotriazole; salicylic acid derivative-based polymerizable ultraviolet absorbers, such as phenyl 2-hydroxy-4-methacryloyloxymethylbenzoate; and 2-cyano-3-phenyl-3-(3'-(meth)acryloyloxyphenyl)propenoic acid methyl ester. Those polymerizable ultraviolet absorbers may be used alone or as a mixture thereof.

Specific examples of the polymerizable ultraviolet absorbing dyestuffs include: benzophenone-based polymerizable ultraviolet absorbing dyestuffs, such as 2,4-dihydroxy-3(p-styrenoazo)benzophenone, 2,4-dihydroxy-5-(p-styrenoazo)benzophenone, 2,4-dihydroxy-3-(p-(meth)acryloyloxymethylphenylazo)benzophenone, 2,4-dihydroxy-5-(p-(meth)acryloyloxymethylphenylazo)benzophenone, 2,4-dihydroxy-3-(p-(meth)acryloyloxyethylphenylazo)benzophenone, 2,4-dihydroxy-5-(p-(meth)acryloyloxyethylphenylazo)benzophenone, 2,4-dihydroxy-3-(p-(meth)acryloyloxypropylphenylazo)benzophenone, 2,4-dihydroxy-5-(p-(meth)acryloyloxypropylphenylazo)benzophenone, 2,4-dihydroxy-3-(o-(meth)acryloyloxymethylphenylazo)benzophenone, 2,4-dihydroxy-5-(o-(meth)acryloyloxymethylphenylazo)benzophenone, 2,4-dihydroxy-3-(o-(meth)acryloyloxyethylphenylazo)benzophenone, 2,4-dihydroxy-5-(o-(meth)acryloyloxyethylphenylazo)benzophenone, 2,4-dihydroxy-3-(o-(meth)acryloyloxypropylphenylazo)benzophenone, 2,4-dihydroxy-5-(o-(meth)acryloyloxypropylphenylazo)benzophenone, 2,4-dihydroxy-3-(p-(N,N-di(meth)acryloyloxyethylamino)phenylazo)benzophenone, 2,4-dihydroxy-5-(p-(N,N-di(meth)acryloyloxyethylamino)phenylazo)benzophenone, 2,4-dihydroxy-3-(o-(N,N-di(meth)acryloyloxyethylamino)phenylazo)benzophenone, 2,4-dihydroxy-5-(o-(N,N-di(meth)acryloylethylamino)phenylazo)benzophenone, 2,4-dihydroxy-3-(p-(N-ethyl-N-(meth)acryloyloxyethylamino)phenylazo)benzophenone, 2,4-dihydroxy-5-(p-(N-ethyl-N-(meth)acryloyloxyethyl-amino)phenylazo)benzophenone, 2,4-dihydroxy-3-(o-(N-ethyl-N-(meth)acryloyloxyethylamino)phenylazo)benzophenone, 2,4-dihydroxy-5-(o-(N-ethyl-N-(meth)acryloyloxyethylamino)phenylazo)benzophenone, 2,4-dihydroxy-3-(p-(N-ethyl-N-(meth)acryloylamino)phenylazo)benzophenone, 2,4-dihydroxy-5-(p-(N-ethyl-N-(meth)acryloylamino)phenylazo)benzophenone, 2,4-dihydroxy-3-(o-(N-ethyl-N-(meth)acryloylamino)phenylazo)benzophenone, and 2,4-dihydroxy-5-(o-(N-ethyl-N-(meth)acryloylamino)phenylazo)benzophenone; benzoic acid-based polymerizable ultraviolet absorbing dyestuffs, such as phenyl 2-hydroxy-4-(p-styrenoazo)benzoate. Those dyestuffs may be used alone or as a mixture thereof.

The total blending amount of the functional monomer may be set to, for example, from 0.001 mass % to 5 mass %, preferably from 0.05 mass % to 3 mass % with respect to the total blending amount of the monomer components (a) and the hydrophilic polymer component (b).

Other Copolymerization Monomer (a-6)

Any appropriate monomer is selected as the copolymerization monomer other than the monomers (a-1) to (a-5) depending on purposes. For example, from the viewpoints of, for example, improving copolymerization reactivity and adjusting the hardness or mechanical strength of the polymer material, there may be used, for example, an alkyl (meth) acrylate whose alkyl group has 1 to 20, preferably 1 to 5 carbon atoms, or an alkoxyalkyl (meth)acrylate whose alkoxyalkyl group has 1 to 20, preferably 1 to 5 carbon atoms.

The blending ratio of the other copolymerization monomer in the polymerizable mixture may be set to, for example, from 0 mass % to 40 mass %, preferably from 0 mass % to 30 mass %, more preferably from 0 mass % to 20 mass % with respect to the total blending amount of the monomer components (a) and the hydrophilic polymer component (b).

Hydrophilic Polymer Component (b)

Any appropriate polymer that can impart surface hydrophilicity to the polymer material may be used as the hydrophilic polymer component. For example, a polymer such as polyvinylamide (e.g., polyvinyllactam), polyamide, polylactone, polyimide, or polylactam may be used as a hydrophilic polymer. Of those, a polymer containing, in a main chain or side chain thereof, a cyclic structure, such as a cyclic amide structure or a cyclic imide structure may be preferably used. The hydrophilic polymer may be a random copolymer, alternate copolymer, block copolymer, or graft copolymer formed of two or more kinds of monomers. In addition, as the hydrophilic polymer component, the hydrophilic polymers may be used alone or in combination thereof.

Specific examples of the hydrophilic polymer include poly-N-vinylpyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, poly-N-vinyl-4,5-dimethyl-2-pyrrolidone, polyvinylimidazole, poly-N-N-dimethylacrylamide, polyvinyl alcohol, poly (meth)acrylic acid, poly(2-hydroxyethyl) (meth)acrylate, polyalkylene glycols, such as polyethylene glycol, poly-2-ethyloxazoline, heparin polysaccharide, polysaccharide, and copolymers thereof. Of those, for example, poly-N-vinylpyrrolidone, polyalkylene glycols, polysaccharide, poly (meth)acrylic acid, polyvinyl alcohol, and poly(2-hydroxyethyl) (meth)acrylate may be preferably used.

The weight-average molecular weight of the hydrophilic polymer may be, for example 100,000 or more, preferably from 150,000 to 2,000,000, more preferably from 300,000 to 1,800,000, still more preferably from 500,000 to 1,500,000.

The K-value of the hydrophilic polymer may be, for example, from 30 to 150, preferably from 60 to 120, more preferably from 90 to 120. Herein, the K-value may be determined by measuring a viscosity by Method I under Viscosity Determination <2.53> in the Japanese Pharmacopoeia, Sixteenth Edition, followed by calculation with Fikentscher's equation in accordance with a method described in the "K-value" section described in the Pharmacopoeia.

The blending amount of the hydrophilic polymer component (b) in the polymerizable mixture may be set to typically from 1 part by mass to 30 parts by mass, preferably from 3 parts by mass to 25 parts by mass, more preferably from 5 parts by mass to 20 parts by mass with respect to 100 parts by mass of the total blending amount of the monomer components (a) and the hydrophilic polymer component (b). When the blending amount of the hydrophilic polymer component falls within the ranges, a polymer material having a high water content and being excellent in surface hydrophilicity can be obtained.

Additive (c)

Any appropriate additive may be selected as the additive depending on purposes. Examples of the additive include a polymerization initiator and an organic solvent.

The polymerization initiator is appropriately selected depending on a polymerization method. As a thermal polymerization initiator to be used for polymerization through heating, there are given, for example, 2,2'-azobisisobutyronitrile, 2,2'-azobis(2,4-dimethylvaleronitrile), benzoyl peroxide, t-butyl hydroperoxide, cumene hydroperoxide, lauroyl peroxide, t-butyl peroxyhexanoate, and 3,5,5-trimethylhexanoyl peroxide. Those thermal polymerization initiators may be used alone or as a mixture thereof.

The blending amount of the thermal polymerization initiator in the polymerizable mixture is preferably from 0.001 part by mass to 2 parts by mass, more preferably from 0.01 part by mass to 1 part by mass with respect to 100 parts by mass of the total blending amount of the monomer components (a) and the hydrophilic polymer component (b).

As a photopolymerization initiator to be used for polymerization through photoirradiation, there are given, for example: phosphine oxide-based photopolymerization initiators, such as 2,4,6-trimethylbenzoyl-diphenylphosphine oxide (TPO) and bis(2,4,6-trimethylbenzoyl)-phenylphosphine oxide; benzoin-based photopolymerization initiators, such as methyl o-benzoylbenzoate, methyl benzoylformate, benzoin methyl ether, benzoin ethyl ether, benzoin isopropyl ether, benzoin isobutyl ether, and benzoin-n-butyl ether; phenone-based photopolymerization initiators, such as 2-hydroxy-2-methyl-1-phenylpropan-1-one p-isopropyl-α-hydroxyisobutylphenone, (HMPPO), p-t-butyltrichloroacetophenone, 2,2-dimethoxy-2-phenylacetophenone, α,α-dichloro-4-phenoxyacetophenone, and N,N-tetraethyl-4,4-diaminobenzophenone; 1-hydroxycyclohexyl phenyl ketone; 1-phenyl-1,2-propanedione-2-(o-ethoxycarbonyl) oxime; thioxanthone-based photopolymerization initiators, such as 2-chlorothioxanthone and 2-methylthioxanthone; dibenzosuberone; 2-ethylanthraquinone; benzophenone acrylate; benzophenone; and benzil. Those photopolymerization initiators may be used alone or as a mixture thereof. In addition, a photosensitizer may be used together with the photopolymerization initiator.

The blending amount of each of the photopolymerization initiator and the photosensitizer in the polymerizable mixture is preferably from 0.001 part by mass to 2 parts by mass, more preferably from 0.01 part by mass to 1 part by mass with respect to 100 parts by mass of the total blending amount of the monomer components (a) and the hydrophilic polymer component (b).

The organic solvent may be a water-soluble organic solvent having high polarity, or may be a water-insoluble organic solvent having low polarity. As the water-soluble organic solvent, for example, an alcohol having 1 to 4 carbon atoms, acetone, methyl ethyl ketone, dimethylformamide, dimethyl sulfoxide, acetonitrile, N-methyl-2-pyrrolidone, dimethoxyethane, tetrahydrofuran, or 1,4-dioxane may be used. When the water-soluble organic solvent is used, compatibility between the monomer components or between the hydrophilic polymer component and the monomer components can be improved. In addition, the water-soluble organic solvent can be easily removed from the polymer material through immersion in water.

As the water-insoluble organic solvent, for example, hexane, cyclohexane, heptane, octane, dimethyl ether, diethyl ether, benzene, toluene, xylene, ethyl acetate, propyl acetate, butyl acetate, dichloromethane, chloroform, carbon tetrachloride, or an alcohol having 6 or more carbon atoms may be used. When the water-insoluble organic solvent is used, compatibility between the monomer components or between the hydrophilic polymer component and the monomer components can be improved. In addition, when the water-insoluble organic solvent is added to the polymerizable mixture, the kinematic viscosity of the polymerizable mixture is reduced to a higher extent than in the case of using the water-soluble organic solvent, and hence the handling of the polymerizable mixture can be facilitated.

The blending amount of the organic solvent in the polymerizable mixture may be, for example, 50 parts by mass or less, preferably 40 parts by mass or less, more preferably 30 parts by mass or less with respect to 100 parts by mass of the total blending amount of the monomer components (a) and the hydrophilic polymer component (b). In the present invention, compatibility among the components in the polymerizable mixture is satisfactory, and hence the organic solvent does not need to be blended or its blending amount can be reduced.

An additive that has hitherto been used in an ocular lens application may be used as an additive other than those described above. Examples thereof include a cooling agent, a viscosifying agent, a surfactant, and a non-polymerizable dyestuff, ultraviolet absorber, or ultraviolet absorbing dyestuff.

The blending amount of the other additive in the polymerizable mixture may be set to, for example, from 0.01 part by mass to 5 parts by mass, preferably from 0.01 part by mass to 3 parts by mass with respect to 100 parts by mass of the total blending amount of the monomer components (a) and the hydrophilic polymer component (b).

B. Polymerization Method

The polymer material of the present invention may be obtained by, for example, subjecting the polymerizable mixture containing the above-mentioned components to heating and/or light (ultraviolet light and/or visible light) irradiation, to copolymerize the monomer components in the polymerizable mixture. In addition, the polymer material may also be obtained by copolymerization through electron beam irradiation in place of the light irradiation.

As a polymerization method, a bulk polymerization method or a solution polymerization method may be used. In the bulk polymerization method, part of the monomer components remain unpolymerized in some cases. In addition, in the solution polymerization method, a solvent that is not involved in the reaction may remain in the resultant polymer. In the production of a medical device, such as a contact lens, in order to reduce the amounts of those residual substances to the extent possible, the following treatment may be performed: the residual substances are dissolved to be removed from the resultant polymer material by immersing the polymer material in water or an organic solvent, or a mixed solution thereof, preferably repeating the immersion.

When the polymer material of the present invention is to be used as a material for an ocular lens, such as a contact lens, the polymerizable mixture may be subjected to a reaction by a molding method. When the polymerizable mixture is to be polymerized through heating by the molding method, a mold corresponding to the shape of a desired ocular lens material is filled with the polymerizable mixture, and the mold is slowly heated.

A heating temperature and a heating time in the heating of the polymerizable mixture in the mold are appropriately set depending on, for example, the composition of the polymerizable mixture. The heating temperature is preferably 50 °C or more and 150 °C or less, more preferably 60 °C or more and 140 °C or less. In addition, the heating time in the heating of the polymerizable mixture in the mold is preferably 10 minutes or more and 120 minutes or less, more preferably 20 minutes or more and 60 minutes or less.

In the molding method, when the polymerizable mixture is to be polymerized through light irradiation, a mold corresponding to the shape of a desired ocular lens material is filled with the polymerizable mixture, and then the mold is irradiated with light. A material for the mold to be used for the polymerization through light irradiation is not particularly limited as long as the material can transmit light required for the polymerization.

The wavelength of the light with which the polymerizable mixture in the mold is irradiated is appropriately set depending on, for example, the kind of photopolymerization initiator to be used. A light irradiance and an irradiation time are appropriately set depending on, for example, the composition of the polymerizable mixture. The light irradiance is preferably from 0.1 $mW/cm^2$ to 100 $mW/cm^2$ or less. The irradiation time is preferably 1 minute or more. Light may be applied stepwise at different irradiances.

Through the polymerization by the molding method, a polymer material having a desired shape is obtained. The polymer material as the molded body thus obtained may be subjected to mechanical processing, such as cutting processing or polishing processing, as required. Cutting may be performed over the entirety of one or both surfaces of the polymer material, or may be performed on part of one surface or both surfaces of the polymer material.

The polymer material of the present invention contains the hydrophilic polymer component as an internal wetting agent, and hence has excellent surface hydrophilicity, but for the purpose of further surface modification, may be subjected to surface modification treatment, such as low-temperature plasma treatment, atmospheric-pressure plasma, or corona discharge.

C. Characteristics of Polymer Material

The oxygen permeability coefficient (Dk value) of the polymer material according to one embodiment of the present invention is preferably 20 Barrer or more, more preferably 30 Barrer or more, still more preferably from 50 Barrer to 150 Barrer.

The water content of the polymer material according to one embodiment of the present invention is preferably 11 mass % or more, more preferably 30 mass % or more, still more preferably from 30 mass % to 70 mass %. When the water content of the polymer material is set to 11 mass % or more, the polymer material to be obtained can be turned into a hydrogel. Accordingly, the polymer material can be improved in wearing sensation when processed into a contact lens, and its strength, oxygen permeability, and surface water wettability can be set in a well-balanced manner.

The Young's modulus of the polymer material according to one embodiment of the present invention is preferably from 0.05 MPa to 2.0 MPa, more preferably from 0.1 MPa to 1.5 MPa, still more preferably from 0.3 MPa to 1.5 MPa. When the Young's modulus of the polymer material is set to from 0.05 MPa to 2.0 MPa, the polymer material can achieve both of wearing sensation and handleability when processed into a contact lens.

EXAMPLES

Now, the present invention is specifically described by way of Examples. However, the present invention is by no means limited to these Examples. The terms "part(s)" and "%" in Examples and Comparative Examples are by mass unless otherwise stated.

Components Used

The meanings of abbreviations for components used in the following Examples and Comparative Examples are shown below.

(1) Hydrophilic Polymer

PVP (K-90, K-120): polyvinylpyrrolidone (2) Silicone-Containing Monomer

AA-PDMS: polymerizable silicone compound having the following structure

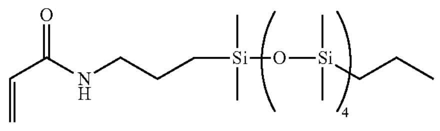

Silicone macromonomer A: silicone macromonomer represented by the general formula (A-2) in which a'=6, b'=10, and n=39

TRIS: tris(trimethylsiloxy)silylpropyl methacrylate (having the following structure)

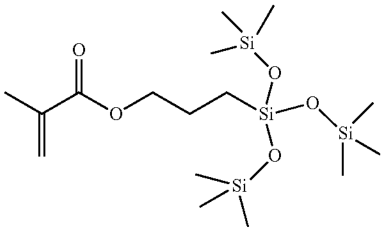 [SMILES: C=C(C)C(=O)OCCC[Si](O[Si](C)(C)C)(O[Si](C)(C)C)O[Si](C)(C)C]

(3) Compatibilizing Monomer

EH(OH)MA: polymerizable compound having the following structure (solubility in water at 25 °C: less than 0.01 g/mL)

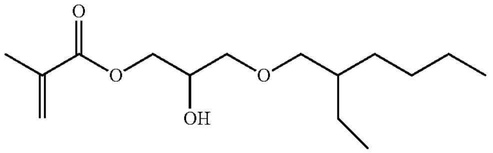 [SMILES: C=C(C)C(=O)OCC(O)COCC(CC)CCCC]

tBu(OH)MA: polymerizable compound having the following structure (solubility in water at 25 °C: less than 0.01 g/mL)

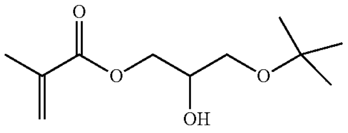

HADA: polymerizable compound having the following structure (manufactured by Mitsubishi Gas Chemical Company, Inc.) (solubility in water at 25 °C: less than 0.01 g/mL)

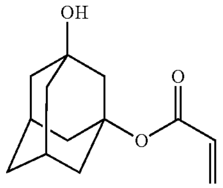 [SMILES: C=CC(=O)OC12CC3CC(CC(O)(C3)C1)C2]

DHADM: polymerizable compound having the following structure (manufactured by Mitsubishi Gas Chemical Company, Inc.) (solubility in water at 25 °C: less than 0.01 g/mL)

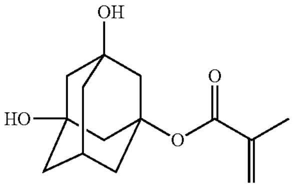 [SMILES: C=C(C)C(=O)OC12CC3CC(O)(CC(O)(C3)C1)C2]

MA(OH)OCO(OH)Hp: polymerizable compound having the following structure (solubility in water at 25 °C: less than 0.01 g/mL)

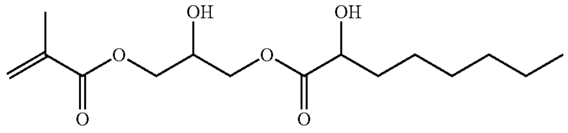 [SMILES: C=C(C)C(=O)OCC(O)COC(=O)C(O)CCCCCC]

C4F9CH2CH(OH)CHMA: polymerizable compound having the following structure (solubility in water at 25 °C: less than 0.01 g/mL)

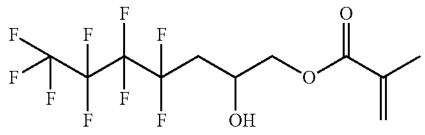 [SMILES: C=C(C)C(=O)OCC(O)CC(F)(F)C(F)(F)C(F)(F)C(F)(F)F]

tBuCO(OH)MA: polymerizable compound having the following structure (solubility in water at 25 °C: less than 0.01 g/mL)

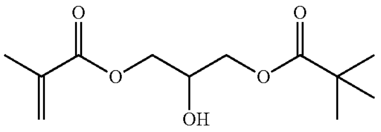 [SMILES: C=C(C)C(=O)OCC(O)COC(=O)C(C)(C)C]

CyCO(OH)MA: polymerizable compound having the following structure (solubility in water at 25 °C: less than 0.01 g/mL)

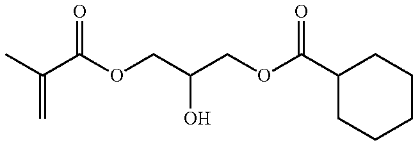 [SMILES: C=C(C)C(=O)OCC(O)COC(=O)C1CCCCC1]

AdaCO(OH)MA: polymerizable compound having the following structure (solubility in water at 25 °C: less than 0.01 g/mL)

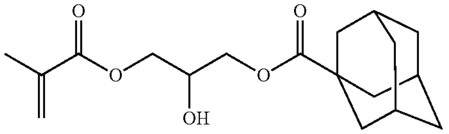 [SMILES: C=C(C)C(=O)OCC(O)COC(=O)C12CC3CC(CC(C3)C1)C2]

iPr(OH)MA: polymerizable compound having the following structure (solubility in water at 25 °C: less than 0.01 g/mL)

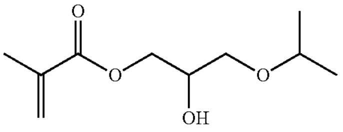

(4) Silicone-containing Monomer having Hydroxyl Group

SiGMA: (3-methacryloxy-2-hydroxypropyloxy)propylbis(trimethylsiloxy)methylsilane (the structure thereof is shown below)

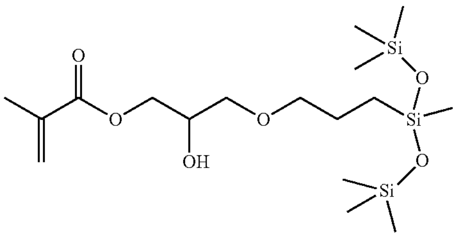 [SMILES: C=C(C)C(=O)OCC(O)COCCC[Si](C)(O[Si](C)(C)C)O[Si](C)(C)C]

(5) Hydrophilic Monomer

DMAA: N,N-dimethylacrylamide

HEMA: 2-hydroxyethyl methacrylate (6) Crosslinkable Monomer

BDDA: 1,4-butanediol diacrylate (7) Functional Monomer

HMEPBT: benzotriazole-based polymerizable ultraviolet absorber (2-(2'-hydroxy-5'-methacryloyloxyethylphenyl)-2H-benzotriazole)

(8) Additive

TPO: initiator (2,4,6-trimethylbenzoyl-diphenylphosphine oxide)

IPA: isopropyl alcohol

Synthesis Example 1: Preparation of EH(OH)MA

1) A brown recovery flask was loaded with ethylhexyl glycidyl ether, methacrylic acid, tetrabutylammonium bromide, and p-methoxyphenol, and the components were dissolved. The flask was fitted with a Dimroth condenser, followed by stirring in an oil bath at 90 °C overnight.
2) The reaction solution was returned to room temperature and dissolved in hexane, and the resultant solution was transferred to a separating funnel.
3) The hexane layer was washed with a 1 M aqueous solution of sodium hydrogen carbonate.
4) The hexane layer was washed with distilled water.
5) The hexane layer was washed with brine.
6) The hexane layer was collected, an appropriate amount of sodium sulfate was added for drying, and the whole was left to stand for a while.
7) Sodium sulfate was removed by filtration.
8) The hexane layer was concentrated under reduced pressure to give a slightly yellowish transparent liquid. $^1H$ NMR ($CDCl_3$, 400 MHZ) and gas chromatographic measurement verified that the desired compound was obtained.

Synthesis Example 2: Preparation of tBu(OH)MA

Synthesis and purification were performed by the same operations as those of Synthesis Example 1 except that ethylhexyl glycidyl ether was replaced with t-butyl glycidyl ether.

Synthesis Example 3: Preparation of MA(OH)OCO(OH)Hp

1) A brown recovery flask was loaded with 2-hydroxyoctanoic acid, glycidyl methacrylate, 4-dimethylaminopyridine, and p-methoxyphenol, and was fitted with a Dimroth condenser, followed by stirring in an oil bath at 85 °C overnight.
2) The reaction solution was returned to room temperature and dissolved in ethyl acetate, and the resultant solution was transferred to a separating funnel.
3) The ethyl acetate layer was washed with a saturated aqueous solution of sodium chloride.
4) The ethyl acetate layer was washed with a solution obtained by mixing a saturated aqueous solution of sodium hydrogen carbonate and distilled water at 5:1.
5) The ethyl acetate layer was washed with distilled water.
6) The ethyl acetate layer was washed with brine.
7) The ethyl acetate layer was collected, an appropriate amount of sodium sulfate was added for drying, and the whole was left to stand for a while.
8) Sodium sulfate was removed by filtration.
9) The ethyl acetate layer was concentrated under reduced pressure to give a transparent liquid. $^1H$ NMR ($CDCl_3$, 400 MHZ) and gas chromatographic measurement verified that the desired compound was obtained.

Synthesis Example 4: Preparation of $C_4F_9CH_2CH(OH)CHMA$

Synthesis and purification were performed by the same operations as those of Synthesis Example 1 except that: ethylhexyl glycidyl ether was replaced with 2,2,3,3,4,4,5,5,5-nonafluoropentyloxirane; and tetrabutylammonium bromide was replaced with triethylamine.

Synthesis Example 5: Preparation of tBuCO(OH)MA

Synthesis and purification were performed by the same operations as those of Synthesis Example 1 except that: ethylhexyl glycidyl ether was replaced with glycidyl methacrylate; methacrylic acid was replaced with pivalic acid; and the reaction temperature was set to 60 °C.

Synthesis Example 6: Preparation of CyCO(OH)MA

Synthesis and purification were performed by the same operations as those of Synthesis Example 1 except that: ethylhexyl glycidyl ether was replaced with glycidyl methacrylate; methacrylic acid was replaced with cyclohexanecarboxylic acid; and the reaction temperature was set to 60 °C.

Synthesis Example 7: Preparation of AdaCO(OH)MA

Synthesis and purification were performed by the same operations as those of Synthesis Example 1 except that: ethylhexyl glycidyl ether was replaced with glycidyl methacrylate; and methacrylic acid was replaced with 1-adamantanecarboxylic acid.

Synthesis Example 8: Preparation of iPr(OH)MA

Synthesis and purification were performed by the same operations as those of Synthesis Example 1 except that ethylhexyl glycidyl ether was replaced with glycidyl isopropyl ether.

Example 1

7 Parts by mass of PVP (K-90) (manufactured by BASF SE) serving as a hydrophilic polymer, 28 parts by mass of AA-PDMS serving as a silicone-containing monomer, 28 parts by mass of EH(OH)MA serving as a compatibilizing monomer, 30 parts by mass of DMAA and 7 parts by mass of HEMA serving as hydrophilic monomers, 1.4 parts by mass of BDDA serving as a crosslinkable monomer, 1.8 parts by mass of HMEPBT serving as a polymerizable ultraviolet absorber, and 0.4 part by mass of TPO serving as a polymerization initiator were mixed to prepare a polymerizable mixture without the use of any solvent. The polymerizable mixture was poured into a mold having a contact lens shape (made of polypropylene, and corresponding to a contact lens having a diameter of 14.2 mm and a thickness of 0.08 mm). Then, photopolymerization was performed by irradiating the mold with LED light at room temperature. After the polymerization, a polymer material having a contact lens shape was removed from the mold. Thus, a contact lens was obtained.

Examples 2 to 13 and Comparative Examples 1 to 8

Contact lenses were obtained in the same manner as in Example 1 except that the polymerizable mixture was prepared by mixing respective components so as to achieve composition shown in Table 1 or Table 2.

The contact lenses obtained in Examples and Comparative Examples described above were each immersed in distilled water and swollen until equilibrium was reached. The water was replaced with a phosphate buffer at a pH of 7.5, and the contact lenses were each swollen until equilibrium was reached. After that, the buffer was replaced with a fresh equal amount of the phosphate buffer, and sterilization was performed in an autoclave at 121 °C for 20 minutes, followed by characteristic evaluations described below. In the measurement of an oxygen permeability coefficient, a plate-type sample processed into a circular shape having a diameter of 14.0 mm was used, which had been subjected to polymerization, hydration treatment, and sterilization treatment in the same manner as above except that a mold made of PP for obtaining a plate-type sample having an average thickness of about 0.3 mm was used in place of the mold having a contact lens shape. The results are shown in Table 1 or Table 2.

External Appearance Evaluation

The external appearance of a contact lens was observed with the naked eye.

Lipid Deposition Evaluation 1) 1 g of an artificial lipid that was solid at ordinary temperature (product name: "PHARMASOL") was placed in each well of a multiwell plate, and heated to 80 °C to be melted.
2) Water on the surface of a contact lens was wiped off, the contact lens was placed in each well, and then the whole was left to stand at room temperature overnight and then at 60 °C for 1 h.
3) The contact lens was removed from the well, rinsed in a contact lens cleaning solution (manufactured by Menicon Co., Ltd., product name: "Epica Cold") in a beaker, and then cleaned by 30 strokes of digital rubbing with a contact lens cleaning solution (manufactured by Menicon Co., Ltd., product name: "Epica Cold").
4) A contact lens cleaning solution (manufactured by Menicon Co., Ltd., product name: "Epica Cold") and the contact lens were placed in each well of a multiwell plate, and the whole was left to stand at 10 °C overnight.
5) The contact lens was removed from the well, and its external appearance was observed with the naked eye and evaluated on the basis of the following criteria.

Criteria

0: The lens is hardly observed to be white.
1: Only a part of the lens is observed to be white.
2: About 50% of the entirety of the lens is observed to be white.
3: The lens is observed to be white nearly throughout its entirety, but has low-turbidity parts in places.
4: The lens is observed to be white throughout its entirety.

Water Content Measurement

Water on the surface of a contact lens adjusted in a phosphate buffer at 20 °C and a pH of 7.5 was lightly wiped off, and its mass (W (g)) in an equilibrium water-containing state was measured. After that, the lens was dried in a dryer set to 105 °C, and then its mass ($W_0$ (g)) in a state of having left to cool was measured. With use of those measured values $W_0$ and W, a water content (mass %) was calculated in accordance with the following equation.

$$\text{Water content (mass \%)} = \{(W - W_0)/W\} \times 100$$

Measurement of Tensile Modulus of Elasticity (Young's Modulus)

A produced contact lens was punched to produce a sample of a dumbbell shape having a stretched portion having a width of about 1.8 mm and a thickness of about 0.1 mm, which was used as a test sample. A tensile test was performed in physiological saline at 20 °C using Shimadzu Precision Universal Tester Autograph AG-IS MS-type manufactured by Shimadzu Corporation, and a Young's modulus (MPa) was calculated as a tensile modulus of elasticity from a stress-elongation curve. A tensile rate was set to 100 mm/min.

Measurement of Oxygen Permeability Coefficient (Dk Value)

As described above, a plate-type sample of a circular shape having a diameter of 14.0 mm was used as a measurement sample. As a reference standard, a similar plate-type sample was produced using a material for "2WEEK Menicon Premio" (manufactured by Menicon Co., Ltd.), and the Dk value thereof was determined to be 129.

The measurement sample was set on an electrode. With use of a Seikaken-type film oxygen permeability meter (manufactured by Rika Seiki Kogyo Co., Ltd.), a current value at a time when an equilibrium state was achieved through nitrogen bubbling in physiological saline at 35 °C was set as zero. Then, a current value at a time when an equilibrium state was achieved through oxygen bubbling was recorded. This procedure was similarly performed on the reference standard. The oxygen permeability coefficient of the lens was calculated in accordance with the following equation. The unit of the oxygen permeability coefficient is ($\times 10^{-11}$ ($cm^2$/sec)·($mLO_2$/(mL×mmHg))=Barrer).

$$Dk \text{ value} = R \times (IS/IR) \times (TS/TR) \times (PR/PS)$$

The meanings of the symbols in the equation are as described below.

R: The Dk value of the reference standard (129)

IS: The current value of the measurement sample (μA)

IR: The current value of the reference standard (μA)

TS: The average thickness of the measurement sample (mm)

TR: The average thickness of the reference standard (mm)

PS: Atmospheric pressure at the time of the measurement of the measurement sample (mmHg)

PR: Atmospheric pressure at the time of the measurement of the reference standard (mmHg)

TABLE 1

| | | Example 1 | Example 2 | Comparative Example 1 | Example 3 | Comparative Example 2 | Example 4 | Comparative Example 3 | Comparative Example 4 |
|---|---|---|---|---|---|---|---|---|---|
| Composition (part(s) by weight) | AA-PDMS | 28 | 28 | 28 | 38 | 38 | 33 | 33 | 33 |
| | EH(OH)MA | 28 | — | — | 18 | — | 23 | — | — |
| | tBu(OH)MA | — | 28 | — | — | — | — | — | — |
| | HADA | — | — | — | — | — | — | — | — |
| | DHADM | — | — | — | — | — | — | — | — |
| | MA(OH)OCO(OH)Hp | — | — | — | — | — | — | — | — |
| | C4F9CH2CH(OH)CHMA | — | — | — | — | — | — | — | — |
| | SiGMA | — | — | 28 | — | 18 | — | 23 | — |
| | DMAA | 30 | 30 | 30 | 30 | 30 | 30 | 30 | 30 |
| | HEMA | 7 | 7 | 7 | 7 | 7 | 7 | 7 | 30 |
| | PVP (K-90) | 7 | 7 | 7 | 7 | 7 | 7 | 7 | 7 |
| | PVP (K-120) | — | — | — | — | — | — | — | — |
| | BDDA | 1.4 | 1.4 | 1.4 | 1.4 | 1.4 | 1.4 | 1.4 | 1.4 |
| | HMEPBT | 1.8 | 1.8 | 1.8 | 1.8 | 1.8 | 1.8 | 1.8 | 1.8 |
| | TPO | 0.4 | 0.4 | 0.4 | 0.4 | 0.4 | 0.4 | 0.4 | 0.4 |
| | IPA | 0 | 0 | 0 | 5 | 5 | 0 | 0 | 0 |
| External appearance | | Transparent | Transparent | Transparent | Transparent | Transparent | Transparent | Slightly white | White |
| Lipid deposition | | 0 | 1 | 3 | 1 | 4 | 1 | Not performed | Not performed |

| | | Example 5 | Comparative Example 5 | Example 6 | Comparative Example 6 | Example 7 | Comparative Example 7 | Example 8 | Comparative Example 8 |
|---|---|---|---|---|---|---|---|---|---|
| Composition (part (s) by weight) | AA-PDMS | 28 | 28 | 38 | 38 | 20 | 20 | 38 | 38 |
| | EH(OH)MA | — | — | — | — | — | — | — | — |
| | tBu(OH)MA | — | — | — | — | — | — | — | — |
| | HADA | 28 | — | — | — | — | — | — | — |
| | DHADM | — | — | 10 | — | — | — | — | — |
| | MA(OH)OCO(OH)Hp | — | — | — | — | 36 | — | — | — |
| | C4F9CH2CH(OH)CHMA | — | — | — | — | — | — | 19 | — |
| | SiGMA | — | 28 | — | 10 | — | 36 | — | 19 |
| | DMAA | 30 | 30 | 40 | 40 | 30 | 30 | 31 | 31 |
| | HEMA | 7 | 7 | 5 | 5 | 7 | 7 | 5 | 5 |
| | PVP (K-90) | 7 | 7 | — | — | 7 | 7 | — | — |
| | PVP (K-120) | — | — | 7 | 7 | — | — | 7 | 7 |
| | BDDA | 1.4 | 1.4 | 1.4 | 1.4 | 1.4 | 1.4 | 1.4 | 1.4 |
| | HMEPBT | 1.8 | 1.8 | 1.8 | 1.8 | 1.8 | 1.8 | 1.8 | 1.8 |
| | TPO | 0.4 | 0.4 | 0.4 | 0.4 | 0.4 | 0.4 | 1.0 | 1.0 |
| | IPA | 15 | 15 | 35 | 35 | 5 | 5 | 20 | 20 |
| External appearance | | Transparent | Transparent | Transparent | Transparent | Transparent | Transparent | Transparent | Transparent |
| Lipid deposition | | 1 | 3 | 0 | 3 | 0 | 3 | 1 | 3 |

TABLE 2

| | | Example 9 | Example 10 | Example 11 | Example 12 | Example 13 |
|---|---|---|---|---|---|---|
| Composition (part(s) by weight) | AA-PDMS | 30 | 30 | 38 | 30 | 43 |
| | EH(OH)MA | 20 | 20 | 10 | 20 | 5 |
| | DMAA | 32 | 32 | 40 | 32 | 40 |
| | HEMA | 5 | 5 | 5 | 5 | 5 |
| | PVP (K-90) | 13 | 13 | — | 13 | — |
| | PVP (K-120) | — | — | 7 | — | 7 |
| | BDDA | 1.4 | 1.4 | 1.4 | 1.4 | 1.4 |
| | HMEPBT | 1.8 | 1.8 | 1.8 | 1.8 | 1.8 |
| | TPO | 0.4 | 0.4 | 0.4 | 0.4 | 0.4 |
| | IPA | 5 | 20 | 20 | 30 | 20 |
| Water content (%) | | 48 | 46 | 50 | 47 | 49 |
| Young's modulus (MPa) | | 0.59 | 0.51 | 0.60 | 0.42 | 0.58 |
| Dk value | | 80 | 77 | 91 | 72 | 110 |

As shown in Table 1, the contact lenses of Examples each had high transparency and showed a more excellent antifouling property against lipids than the contact lenses of Comparative Examples. In addition, as shown in Table 2, it is found that the contact lenses of Examples each have practically sufficient oxygen permeability and a practically sufficient water content and have mechanical strength suited for a contact lens application.

Examples 14 to 17

Contact lenses were obtained in the same manner as in Example 1 except that the polymerizable mixture was prepared by mixing respective components so as to achieve composition shown in Table 3.

The contact lenses obtained in Examples 14 to 17 described above were each immersed in distilled water and swollen until equilibrium was reached. The water was replaced with a phosphate buffer at a pH of 7.5, and the contact lenses were each swollen until equilibrium was reached. After that, the buffer was replaced with a fresh equal amount of the phosphate buffer, and sterilization was performed in an autoclave at 121 °C for 20 minutes, followed by the same external appearance evaluation and lipid deposition evaluation as those of Example 1. The results are shown in Table 3.

TABLE 3

| | | Example 14 | Example 15 | Example 16 | Example 17 |
|---|---|---|---|---|---|
| Composition (part(s) by weight) | AA-PDMS | 28 | 28 | 28 | 28 |
| | iPr(OH)MA | 28 | — | — | — |
| | tBuCO(OH)MA | — | 28 | — | — |
| | CyCO(OH)MA | — | — | 28 | — |
| | AdaCO(OH)MA | — | — | — | 28 |
| | DMAA | 30 | 30 | 30 | 30 |
| | HEMA | 7 | 7 | 7 | 7 |
| | PVP K-90 | 7 | 7 | 7 | 7 |
| | BDDA | 1.4 | 1.4 | 1.4 | 1.4 |
| | HMEPBT | 1.8 | 1.8 | 1.8 | 1.8 |
| | TPO | 0.4 | 0.4 | 0.4 | 0.4 |
| | IPA | 15 | 15 | 15 | 15 |
| External appearance | | Transparent | Transparent | Transparent | Transparent |
| Lipid deposition | | 0 | 0 | 0 | 0 |

As shown in Table 3, the contact lenses of Examples each achieved practically sufficient transparency and had an excellent antifouling property against lipids.

Examples 18 and 19

Contact lenses were obtained in the same manner as in Example 1 except that the polymerizable mixture was prepared by mixing respective components so as to achieve composition shown in Table 4.

The contact lenses obtained in Examples 18 and 19 described above were each immersed in distilled water and swollen until equilibrium was reached. The water was replaced with a phosphate buffer at a pH of 7.5, and the contact lenses were each swollen until equilibrium was reached. After that, the buffer was replaced with a fresh equal amount of the phosphate buffer, and sterilization was performed in an autoclave at 121 °C for 20 minutes, followed by the same external appearance evaluation and lipid deposition evaluation as those of Example 1 and the measurement of characteristics. The results are shown in Table 4.

TABLE 4

| | | Example 18 | Example 19 |
|---|---|---|---|
| Composition (part(s) by weight) | AA-PDMS | 30 | — |
| | Silicone macromonomer A | 15 | — |
| | TRIS | — | 25 |
| | EH(OH)MA | 15 | 32 |
| | DMAA | 25 | 31 |
| | HEMA | 5 | 5 |
| | PVP K-90 | 10 | 7 |
| | BDDA | — | 1.4 |
| | HMEPBT | 1.8 | 1.8 |
| | TPO | 1.0 | 1.0 |
| | IPA | 20 | 20 |
| External appearance | | Transparent | Transparent |
| Lipid deposition | | 1 | 1 |
| Water content (%) | | 37 | 40 |
| Young's modulus (MPa) | | 0.97 | 0.61 |
| Dk value | | 103 | 51 |

As shown in Table 4, the contact lenses of Examples each had high transparency and showed an excellent antifouling property against lipids. In addition, it is found that the contact lenses of Examples each have practically sufficient oxygen permeability and a practically sufficient water content and have mechanical strength suited for a contact lens application.

INDUSTRIAL APPLICABILITY

The polymer material of the present invention is suitably used for an ophthalmic medical device, for example, an ocular lens, such as contact lens, an intraocular lens, an artificial cornea, a corneal onlay, or a corneal inlay.

The invention claimed is:

1. A polymer material, which is obtained by polymerizing a polymerizable mixture containing monomer components (a) and a hydrophilic polymer component (b), wherein the monomer components (a) include a silicone-containing monomer (a-1) having a siloxane bond and being free of any hydroxyl group, a compatibilizing monomer (a-2) having a hydrogen bonding proton-containing group and being free of any silicon atom, and a hydrophilic monomer (a-3), wherein the compatibilizing monomer (a-2) has a solubility of less than 0.03 g/mL in water at 25 °C, wherein the compatibilizing monomer (a-2) is selected from the group consisting of compounds of Formula (I), Formula (V), and Formula (VI):

<Compound of Formula (I)>

(I)

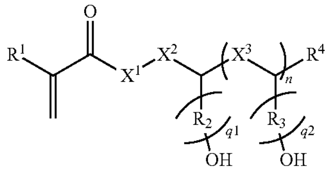

where:

$R^1$ represents a hydrogen atom or a methyl group;

$R^2$ and $R^3$ each independently represent an alkylene group having 1 to 6 carbon atoms;

$R^4$ represents a hydrocarbon group having 2 to 20 carbon atoms, or a structure represented by $-(R^{5a})_s-O-R^{5b}$, $-(R^{5a})_s-O(C{=}O)-R^{5b}$, or $-(R^{5a})-(C{=}O)O-R^{5b}$, where $R^{5a}$ represents an alkylene group having 1 to 4 carbon atoms, Rob represents a hydrocarbon group having 2 to 20 carbon atoms, and "s" represents 0 or 1;

$X^1$ represents O or $NR^6$, where $R^6$ represents hydrogen or an alkyl group having 1 to 4 carbon atoms;

$X^2$ represents a single bond or an alkylene group having 1 to 3 carbon atoms;

$X^3$ represents a single bond, an alkylene group having 1 to 6 carbon atoms, or a structure represented by $-(R^{7a})\{-O-(R^{7b})-$, $-(R^{7a})$, $-O(CO)-(R^{7b})_u-$, $-(R^{7a})_t-(C{=}O)O-(R^{7b})_u-$, $-(R^{7a})_t-(C{=}O)-(R^{7b})_u-$, or any one of the following Formula (II) to (IV):

(II)

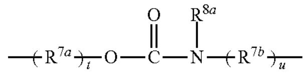

(III)

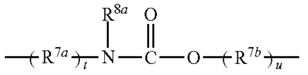

(IV)

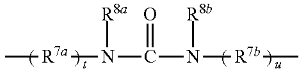

where $R^{7a}$ represents an alkylene group having 1 to 4 carbon atoms, $R^{7b}$ represents an alkylene group having 1 to 20 carbon atoms, $R^{8a}$ and $R^{8b}$ each independently represent a hydrogen atom or an alkyl group having 1 to 4 carbon atoms, and t and u each independently represent 0 or 1;

n represents an integer of from 0 to 10; and q1 and q2 each independently represent 0 or 1, provided that:

a total number of carbon atoms contained in a residue excluding the polymerizable functional group ($CH_2{=}CR^1-CO-$) is 4 or more; and the hydrocarbon groups or alkyl groups set forth in $R^4$, $R^{5b}$, $R^6$, $R^{8a}$, and $R^{8b}$ independently have no heteroatom;

<Compound of Formula (V)>

(V)

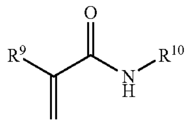

where:

$R^9$ represents a hydrogen atom or a methyl group; and $R^{10}$ represents a hydrocarbon group having 4 to 20 carbon atoms, or a structure represented by $-O-R^{10b}$, $-R^{10a}-O-R^{10b}$, $-R^{10a}-O(C{=}O)-R^{10b}$, $-R^{10a}-(C{=}O)O-R^{10b}$, or $-R^{10a}-(C{=}O)-R^{10b}$, where $R^{10a}$ represents an alkylene group having 1 to 4 carbon atoms, and $R^{10b}$ represents a hydrocarbon group having 2 to 20 carbon atoms, provided that:

a total number of carbon atoms contained in the group represented by $R^{10}$ is 4 or more; and the hydrocarbon group set forth in $R^{10}$ and $R^{10b}$ has no heteroatom;

<Compound of Formula (VI)>

(VI)

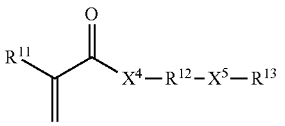

where:

$R^{11}$ represents a hydrogen atom or a methyl group;

$X^4$ represents O or $NR^{14}$, where $R^{14}$ represents a hydrogen atom or an alkyl group having 1 to 4 carbon atoms;

$R^{12}$ represents an alkylene group having 2 to 14 carbon atoms;

$X^5$ represents a single bond, O, or a structure represented by any one of the following Formula (VII) to (IX):

(VII)

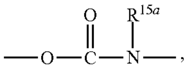

(VIII)

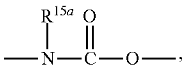

(IX)

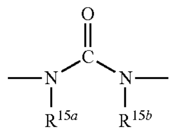

where $R^{15a}$ and $R^{15b}$ each independently represent a hydrogen atom or an alkyl group having 1 to 4 carbon atoms; and $R^{13}$ represents a hydrocarbon group having 2 to 20 carbon atoms, provided that:

when $X^4$ does not represent NH, $X^5$ represents a structure containing a urethane bond (—NHCOO—) or a urea bond (—NHCONH—); and $R^{12}$, $R^{13}$, $R^{14}$, $R^{15a}$, and $R^{15b}$ each independently have no heteroatom, wherein the hydrophilic monomer (a-3) is selected from the group consisting of: hydroxyethyl (meth)acrylate, hydroxypropyl (meth)acrylate, dihydroxypropyl (meth)acrylate, N,N-dimethyl (meth)acrylamide, N-ethyl (meth)acrylamide, N-2-hydroxyethyl (meth) acrylamide, N-isopropyl (meth)acrylamide, N-acryloylmorpholine, N-vinylpyrrolidone, N-vinylpiperidone, N-vinylcaprolactam, and 1-methyl-3-methylene-2-pyrrolidinone, and wherein a water content of the polymer material is 11 mass % or more.

2. The polymer material according to claim 1, wherein the compatibilizing monomer (a-2) has six or more carbon atoms, excluding the carbon atoms contained in the polymerizable functional group.

3. The polymer material according to claim 1, wherein a blending ratio of the compatibilizing monomer (a-2) is from 5 mass % to 50 mass % with respect to a total blending amount of the monomer components (a) and the hydrophilic polymer component (b).

4. The polymer material according to claim 1, wherein a blending ratio of the hydrophilic polymer component (b) in the polymerizable mixture is from 1 mass % to 30 mass % with respect to a total blending amount of the monomer components (a) and the hydrophilic polymer component (b).

5. The polymer material according to claim 1, wherein the compatibilizing monomer (a-2) has:

the polymerizable functional group;

an intermediate portion containing the hydrogen bonding proton-containing group; and a hydrophobic terminal portion containing two or more carbon atoms.

6. The polymer material according to claim 5, wherein the hydrophobic terminal portion contains a branched hydrocarbon group and/or a hydrocarbon group containing a cyclic structure.

7. The polymer material according to claim 1, wherein the monomer components (a) further include a functional monomer (a-5), wherein the functional monomer (a-5) includes at least one selected from a group consisting of a polymerizable dyestuff, a polymerizable ultraviolet absorber, and a polymerizable ultraviolet absorbing dyestuff.

8. The polymer material according to claim 1, wherein the hydrogen bonding proton-containing group contains a hydroxyl group.

9. The polymer material according to claim 1, wherein the silicone-containing monomer (a-1) contains a nitrogen atom.

10. The polymer material according to claim 1, wherein the hydrophilic polymer component (b) has a weight average molecular weight of 100,000 or more.

11. The polymer material according to claim 1, wherein the hydrophilic polymer component (b) is polyvinylamide.

12. The polymer material according to claim 1, wherein the hydrophilic polymer component (b) contains at least one kind selected from a group consisting of: poly-N-vinylpyrrolidone, a polyalkylene glycol, a polysaccharide, poly (meth)acrylic acid, and polyvinyl alcohol.

13. The polymer material according to claim 1, wherein the polymer material has a Young's modulus of from 0.05 MPa to 2.0 MPa.

14. An ophthalmic medical device, comprising the polymer material of claim 1.

15. The ophthalmic medical device according to claim 14, wherein the ophthalmic medical device is a contact lens.

* * * * *